United States Patent
Mironica

(10) Patent No.: US 11,887,277 B2
(45) Date of Patent: Jan. 30, 2024

(54) REMOVING COMPRESSION ARTIFACTS FROM DIGITAL IMAGES AND VIDEOS UTILIZING GENERATIVE MACHINE-LEARNING MODELS

(71) Applicant: Adobe Inc., San Jose, CA (US)

(72) Inventor: Ionut Mironica, Bucharest (RO)

(73) Assignee: Adobe Inc., San Jose, CA (US)

( * ) Notice: Subject to any disclaimer, the term of this patent is extended or adjusted under 35 U.S.C. 154(b) by 290 days.

(21) Appl. No.: 17/182,510

(22) Filed: Feb. 23, 2021

(65) Prior Publication Data
US 2022/0270209 A1 Aug. 25, 2022

(51) Int. Cl.
*G06T 5/00* (2006.01)
*G06T 9/00* (2006.01)
*G06N 3/088* (2023.01)
*G06N 3/045* (2023.01)

(52) U.S. Cl.
CPC ............ *G06T 5/001* (2013.01); *G06N 3/045* (2023.01); *G06N 3/088* (2013.01); *G06T 9/00* (2013.01); *G06T 2207/20081* (2013.01); *G06T 2207/20084* (2013.01)

(58) Field of Classification Search
CPC . G06T 5/001; G06T 9/00; G06T 2207/20081; G06T 2207/20084; G06N 3/045; G06N 3/088
See application file for complete search history.

(56) References Cited

U.S. PATENT DOCUMENTS

| 2019/0082177 A1* | 3/2019 | Cho | H04N 19/86 |
| 2021/0265016 A1* | 8/2021 | Vessere | G06N 3/084 |
| 2022/0164671 A1* | 5/2022 | Dong | G06N 3/084 |

FOREIGN PATENT DOCUMENTS

| CN | 110517329 A | * | 11/2019 | G06K 9/6267 |
| DE | 102021105080 A1 | * | 9/2021 | G06K 9/46 |
| WO | WO-2020165490 A1 | * | 8/2020 | G06N 3/08 |

OTHER PUBLICATIONS

Zhang et al., DMCNN: Dual-Domain Multi-Scale Convolutional Neural Network for Compression Artifacts Removal, Oct. 2018, IEEE, pp. 390-384 (Year: 2018).*
Zhang et al., DMCNN: Dual-Domain Multi-Scale Convolutional Neural Network for Compression Artifacts Removal, Oct. 2018, IEEE. (Year: 2018).*

(Continued)

*Primary Examiner* — Wednel Cadeau
(74) *Attorney, Agent, or Firm* — Keller Preece PLLC

(57) ABSTRACT

The present disclosure relates to an image artifact removal system that improves digital images by removing complex artifacts caused by image compression. For example, in various implementations, the image artifact removal system builds a generative adversarial network that includes a generator neural network and a discriminator neural network. In addition, the image artifact removal system trains the generator neural network to reduce and eliminate compression artifacts from the image by synthesizing or retouching the compressed digital image. Further, in various implementations, the image artifact removal system utilizes dilated attention residual layers in the generator neural network to accurately remove compression artifacts from digital images of different sizes and/or having different compression ratios.

20 Claims, 13 Drawing Sheets

(56) References Cited

OTHER PUBLICATIONS

Y. Li, F. Guo, R. T. Tan, and M. S. Brown, "A contrast enhancement framework with jpeg artifacts suppression", In ECCV, pp. 174-188. 2014.
D. Sun and W.-K. Cham "Postprocessing of low bit-rate block DCT coded images based on a field of experts prior", TIP, 16(11):2743-2751, 2017.
Chunwei Tian, Lunke Fei, Wenxian Zheng, Yong Xu, Wangmeng Zuo, Chia-Wen Lin, "Deep Learning on Image Denoising: An overview", 2020.
Chao Dong, Chen Change Loy, Kaiming He, Xiaoou Tang, "Image Super-Resolution Using Deep Convolutional Networks", IEEE Transactions on Pattern Analysis and Machine Intelligence (TPAMI), Preprint, 2015.
X. Zhang, W. Yang, Y. Hu, and J. Liu. "DM-CNN: Dual-domain multi-scale convolutional neural network for compression artifacts removal", arXiv preprint arXiv:1806.03275, 2018.
Y. Zhang, K. Li, K. Li, L. Wang, B. Zhong, and Y. Fu, "Image super-resolution using very deep residual channel attention networks", arXiv preprint arXiv:1807.02758, 2018.
M. Haris, G. Shakhnarovich, and N. Ukita, "Deep backprojection networks for superresolution", In Conference on Computer Vision and Pattern Recognition, 2018.
E. Agustsson, R. Timofte, "Ntire 2017 challenge on single image super-resolution: Dataset and study", in Proceedings of the Conference on Computer Vision and Pattern Recognition (CVPR) Workshops (2017).
M. Bevilacqua, A. Roumy, C. Guillemot, M. Alberi-Morel, "Low-complexity singleimage super-resolution based on nonnegative neighbor embedding", in Proceedings of the British Machine Vision Conference (BMVC) (2012).
J. Yang, J. Wright, T.S. Huang, Y. Ma, "Image super-resolution via sparse representation", in IEEE Transactions on Image Processing 19(11), 2861-2873 (2010).
H. R. Sheikh, Z. Wang, L. Cormack, A. C. Bovik, "Live image quality assessment database release", 2005.
Phillip Isola, Jun-Yan Zhu, Tinghui Zhou, Alexei Efros, "Image-to-Image Translation with Conditional Adversarial Networks", on IEEE Conference on Computer Vision and Pattern Recognition (CVPR), 2017.
Wangmeng Zuo, Kai Zhang, Lei Zhang, Convolutional Neural Networks for Image Denoising and Restoration, on Denoising of Photographic Images and Video: Fundamentals, Open Challenges and New Trends, 2018, Springer International Publishing, DOI10.1007/978-3-319-96029-6_4, https://doi.org/10.1007/978-3-319-96029-6_4.
C. Dong, Y. Deng, C. C. Loy and X. Tang, "Compression Artifacts Reduction by a Deep Convolutional Network" 2015 IEEE International Conference on Computer Vision (ICCV), Santiago, 2015, pp. 576-584, doi: 10.1109/ICCV.2015.73.
K. Zhang, W. Zuo, Y. Chen, D. Meng and L. Zhang, "Beyond a Gaussian Denoiser: Residual Learning of Deep CNN for Image Denoising" in IEEE Transactions on Image Processing, vol. 26, No. 7, pp. 3142-3155, Jul. 2017, doi: 10.1109/TIP.2017.2662206.
Hongyi Zhang, Yann N. Dauphin, Tengyu Ma, "Fixup Initialization: Residual Learning Without Normalization", 7th International Conference on Learning Representations (ICLR 2019).

\* cited by examiner

JPEG Quality Factor Comparison
(Live 1 Dataset)

| Model | 90% Compression | | 80% Compression | | 70% Compression | |
|---|---|---|---|---|---|---|
| | PSNR | SSIM | PSNR | SSIM | PSNR | SSIM |
| ARCNN | 25.92 | 0.76 | 28.55 | 0.84 | 29.86 | 0.87 |
| FAST-ARCNN | 26.26 | 0.76 | 28.27 | 0.83 | 29.41 | 0.86 |
| DN-CNN | 26.34 | 0.77 | 27.89 | 0.83 | 29.36 | 0.87 |
| Pix2Pix | 26.43 | 0.76 | 28.60 | 0.84 | 29.61 | 0.86 |
| Image Artifact Removal System | 29.34 | 0.87 | 30.19 | 0.92 | 30.21 | 0.92 |

*Fig. 6*

REMOVING COMPRESSION ARTIFACTS FROM DIGITAL IMAGES AND VIDEOS UTILIZING GENERATIVE MACHINE-LEARNING MODELS

BACKGROUND

Recent years have seen a significant increase in digital image editing. Indeed, advances in both hardware and software have increased the ability to capture, create, edit, and store digital images. Often digital images are stored utilizing lossy compression methods. Lossy compression methods (e.g. JPEG images and HEVC videos) form a data encoding class that utilizes approximations for representing the multimedia content. Today, the use of lossy compression has become indispensable for reducing bandwidth and storage space requirements due to the massive amounts of digital content being rapidly created. However, these lossy compression methods have introduced undesired complex artifacts that decrease the quality, accuracy, and processing efficiency of compressed digital images.

Despite modern advances, conventional systems are still unable to effectively correct and/or remove compression artifacts. Indeed, conventional systems continue to suffer from several problems with regard to the accuracy, efficiency, and flexibility with respect to correcting compression artifacts in lossy images. For example, some conventional systems attempt to remove one type of compression artifact, but inaccurately and inefficiently introduce other types of compression artifacts. Other conventional systems are unable to remove compression artifacts in a realistic or natural manner. Further, some conventional systems are unable to utilize a single model to correct compression artifacts across a range of compression ratios but rather, require numerous separate models to address the different compression ratios.

Accordingly, these along with additional problems and issues exist in current solutions with respect to the technical field of digital image editing.

BRIEF SUMMARY

Implementations of the present disclosure provide benefits and/or solve one or more of the foregoing or other problems in the art with systems, non-transitory computer-readable media, and methods that utilize a generative machine-learning model to accurately and efficiently remove complex compression artifacts from compressed digital images. In various implementations, the generator neural network includes dilated attention residual neural network layers that assist in removing compression artifacts. Further, in one or more implementations, the disclosed systems adjust the operation of the generator neural network based on compression ratios of input images such that a single generator neural network is able to remove compression artifacts from input images having different compression ratios.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIG. 6 illustrates a chart comparing state-of-the-art deblocking oriented models with the image artifact removal system in accordance with one or more implementations with state-of-the-art systems.

DETAILED DESCRIPTION

Figure 1:
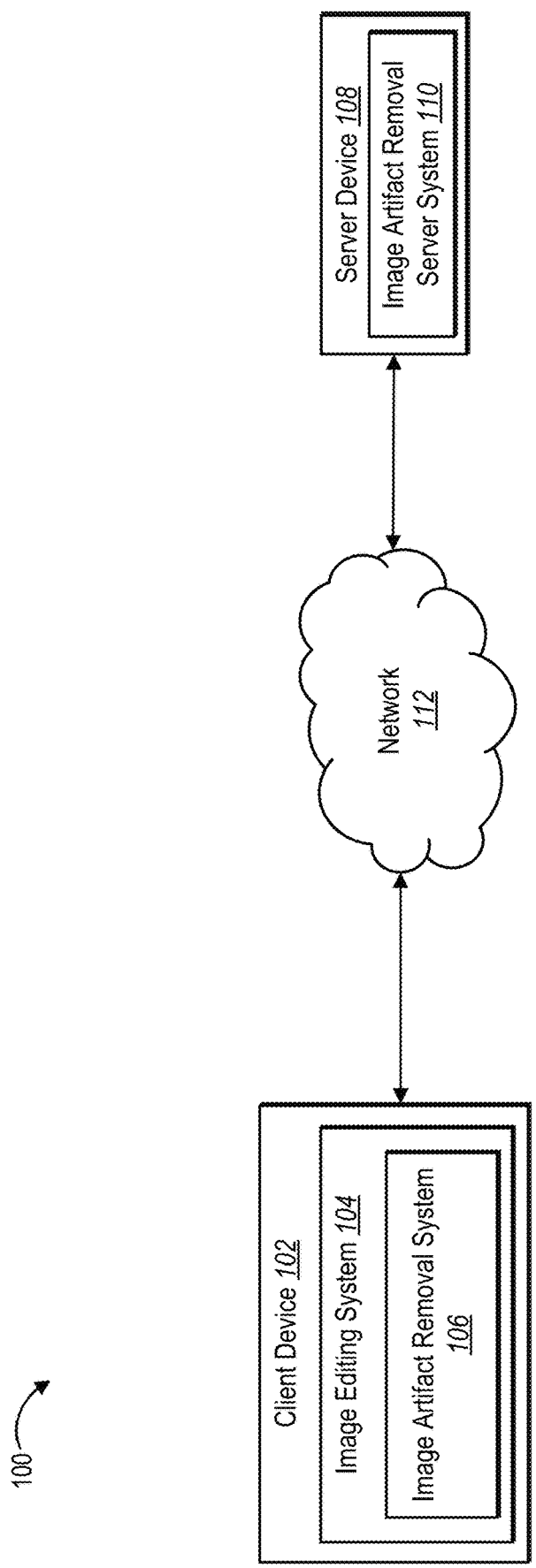
FIG. 1 illustrates a schematic diagram of a system environment in which an image artifact removal system operates in accordance with one or more implementations.

This disclosure describes one or more implementations of an image artifact removal system that improves digital images by removing complex artifacts caused by image compression. To illustrate, in some implementations, the image artifact removal system identifies a compressed digital image that includes compression artifacts. Further, the image artifact removal system can determine the compression ratio of the image. In addition, the image artifact removal system generates an improved digital image based on the compression ratio utilizing the generator neural network, which includes various dilated attention residual components, by removing the compression artifacts from the image. Moreover, the image artifact removal system can provide the improved image to a client device for display.

As mentioned above, in one or more implementations, the image artifact removal system utilizes a generative adversarial network (GAN) architecture to improve digital images (and digital videos) by realistically correcting compression artifacts in compressed digital images. For example, in some implementations, the GAN includes a generator neural network (or simply "generator"). In various implementations, the generator includes various layers, blocks, components, and/or elements. For example, in one or more implementations, the generator includes multiple dilated attention residual layers that each include a channel attention mapping mechanism. In various implementations, the dilated attention residual layers also include dilated convolutions to ensure contextual consistency across different compression ratios, as further mentioned below. Accordingly, in some implementations, the image artifact removal system utilizes the dilated attention residual layers to remove blocking compression artifacts and ringing compression artifacts from the compressed digital image.

As mentioned above, in one or more implementations, the image artifact removal system determines the compression ratio of a compressed digital image. Indeed, in various implementations, the image artifact removal system builds the generator to accurately operate across a range of compressed ratios. As described below, in example implementations, the image artifact removal system encodes and incorporates the compression ratio of a digital image into the generator. Based on the compression ratio, the image artifact removal system adjusts the operation of the generator to yield accurate and realistic image outputs. Accordingly, the image artifact removal system is able to flexibly utilize a single generator neural network with different types of compressed digital images.

The image artifact removal system utilizes the generator to remove complex compression artifacts from compressed digital images. For example, in one or more implementations, the image artifact removal system provides an input compressed digital image to the generator. In addition, the image artifact removal system determines and provides the compression ratio of the image. In some implementations, the image artifact removal system allows for user input to modify or change the compression ratio. Based on the compression ratio, the generator outputs an improved image that accurately removes the complex compression artifacts, such as blurring, blocking, and ringing artifacts. Further, in some implementations, the image artifact removal system provides the improved image for display on a client device.

In a number of implementations, the image artifact removal system learns parameters for a generative adversarial network that includes a generator neural network and a discriminator neural network. In these implementations, the image artifact removal system learns parameters for the generator neural network to correct a compressed digital image by reducing or eliminating compression artifacts from the image. In one or more implementations, the image artifact removal system fine-tunes dilated attention residual layers in the generator neural network to more consistently remove compression artifacts in an image as well as across images having different image compression ratios.

In one or more implementations, the image artifact removal system utilizes a multi-loss function to learn parameters for the generator (i.e., generator neural network). For example, in some implementations, the image artifact removal system utilizes both a pixel loss and a perceptual loss to improve the performance of the generator. Further, in various implementations, the image artifact removal system utilizes additional loss functions to update and improve the discriminator (i.e., discriminator neural network).

As mentioned above, the image artifact removal system improves compressed digital images. For example, the image artifact removal system improves JPEG images and other compressed digital image types by removing artifacts therefrom. In various implementations, the image artifact removal system also improves compressed video files. For example, in these implementations, the image artifact removal system provides sets of consecutive image frames to the image artifact removal system for compression artifact removal. The image artifact removal system removes compression artifacts for each video frame as well as ensures consistency and smooth transition from one frame to the next.

As noted above, lossy compression methods (e.g. JPEG images and HEVC videos) introduce undesired complex compression artifacts that decrease the quality, accuracy, and processing efficiency of compressed digital images. For instance, many conventional systems utilize compression schemes (e.g., discrete cosine transformation (DCT), quantization, or other lossy encodings) that cause inaccurate and unwanted complex compression image artifacts such as ringing effect artifacts and blurring artifacts. As a result, lossy compression introduces inaccuracies in compressed digital images in the form of complex image artifacts. Additionally, these complex image artifacts adversely affect the processing efficiency of various low-level image-processing routines that utilize compressed images as input (e.g. image and video enhancement and super-resolution). Further, complex artifacts may severely reduce the user experience.

As mentioned above, one lossy compression scheme is a JPEG compression scheme. Commonly, a JPEG compression scheme divides an image into 8×8 pixel blocks and applies block DCT on each block individually. Quantization is then applied to the DCT coefficients to save storage space. However, this step can cause a combination of different complex artifacts, such as blocking artifacts, ringing effect artifacts, and blurring artifacts. Largely, blocking artifacts arise when each block is encoded without considering the correlation with adjacent blocks, resulting in discontinuities at the borders of pixel blocks. Ringing effect artifacts occur along the edges of pixel blocks due to a coarse quantization of the high-frequency components (e.g., the Gibbs phenomenon). Further, blurring artifacts often occur to the loss of high-frequency components.

In addition to digital images, videos are often stored under a lossy compression scheme. For example, videos stored in HEVC (e.g., H.265 and H.264) are stored in a lossy video format. HEVC uses integer DCT and discrete sine transformation (DST) transforms with varied block sizes between 4×4 and 32×32. In some instances, HEVC reduces the size of a video up to 50%. However, like JPEG images, HEVC also introduces compression artifacts to images (e.g., frames) within a video.

As also mentioned above, in attempting to correct compression artifacts in lossy images, conventional systems include a number of problems with regard to accuracy, efficiency, and flexibility of computing device operations. As a first example, many conventional systems are inaccurate. Indeed, most conventional systems are unable to remove compression artifacts by adding realistic details without introducing additional distortion artifacts (e.g., ringing effect artifacts and blurring artifacts). To illustrate, one type of conventional system that attempts to correct compression artifacts employs a deblocking algorithm. Largely, deblocking algorithms focus on removing blocking and ringing artifacts in the spatial domain or frequency domain. However, these conventional systems are often unable to reproduce sharp edges in the image and commonly over-smooth texture regions. As a result, deblocking algorithms often remove one type of complex compression artifact at the cost of introducing other types of complex compression artifacts.

Another type of conventional system that attempts to correct compression artifacts employs restoration oriented methods. Here, these conventional systems decompress compressed digital images utilizing distortion restoration.

However, these conventional systems are typically not able to reproduce realistic details of the restored objects, leading to further inaccurate results.

Similarly, conventional systems that employ deep learning approaches to solve compression artifacts also suffer from inaccuracies. For example, some of these conventional systems generate inaccurate and noisy patterns in a reconstructed image. Other conventional systems generate images that include unrealistic details as well as create burry areas in reconstructed images.

In addition, numerous conventional systems are inefficient. To illustrate, as mentioned above, some conventional systems that employ deep learning approaches to solve compression artifacts introduce noisy patterns in a reconstructed image, which causes lower processing performance. Further, many of these conventional systems require a very large training dataset and training a large number of model parameters (e.g., over 15 Million). As a result, these conventional systems require massive amounts of processing and storage resources.

Additionally, many conventional systems are inflexible. As noted above, conventional systems are often rigidly limited to addressing images having the same compression ratio. Accordingly, when provided with a compressed digital image having a different compression ratio, the conventional system is unable to inference the digital image. Rather, the conventional system needs to obtain and utilize another deep learning model, trained with a separate large training dataset. Indeed, for each different compression ratio, these conventional systems need to obtain and employ additional deep learning models or else compression artifacts in the compressed digital image may not be able to be corrected effectively.

As previously mentioned, the image artifact removal system provides numerous advantages and benefits over conventional systems. Indeed, in many implementations, the image artifact removal system improves accuracy, flexibility, and efficiency. To illustrate, as noted above, the image artifact removal system employs a generative adversarial network ("GAN") architecture and utilizes a generator neural network from the GAN architecture to accurately remove complex compression artifacts from a compressed digital image in a manner that does not introduce additional distortion artifacts. Indeed, utilizing the GAN architecture, the image artifact removal system generates improved images by adding realistic details in place of compression artifacts. Further, regarding digital videos, the image artifact removal system accurately removes compression artifacts within video frames while also providing continuity between each improved frame of the video, as described below.

Indeed, the image artifact removal system generates results that are improved over conventional systems including state-of-the-art systems according to both quantitative and qualitative metrics. For example, empirical evidence regarding the accuracy of conventional systems compared to the image artifact removal system is provided below with respect to FIG. 6. Further, examples comparing visual accuracy and image realness are described and provided below with respect to in FIGS. 7A-7B.

Additionally, in one or more implementations, the image artifact removal system improves efficiency over conventional systems. As one example, the image artifact removal system does not introduce noisy patterns when generating improved digital images. In contrast, because of its simplicity, in many implementations, the image artifact removal system is able to outperform other conventional systems (e.g., state-of-the-art systems) with lower complexity and processing requirements.

As mentioned above, unlike conventional systems, the image artifact removal system does not need to train a separate model for each different compression ratio. Rather, in one or more implementations, the image artifact removal system creates/utilizes a generator neural network that reconstructs details in a compressed digital image across a range of compression ratios. In this manner, the image artifact removal system reduces the complexity and size of the model. Indeed, the final size of the generator (e.g., 1.2 megabytes in some implementations) is much smaller than the combined size of multiple separate conventional systems models needed to perform the same operations.

In one or more implementations, the image artifact removal system improves flexibility over conventional systems. For example, as recently mentioned, in various implementations, the image artifact removal system utilizes the same generator neural network for different images having different compression ratios. In addition, the image artifact removal system is able to build the generator neural network with a comparatively small dataset. Further, the image artifact removal system is able to apply the GAN architecture to images across a range of resolutions and compression ratios.

Additional advantages and benefits of the image artifact removal system will become apparent in view of the following description. In particular, one or more embodiments of the image artifact removal system will be described below with reference to one or more figures. Further, the following definitions of terms will be used to describe one or more features of the image artifact removal system.

As used herein, the term "digital image" (or simply "image") refers to a digital graphics file that when rendered displays objects and/or elements. In particular, an image can include one or more objects associated with any suitable element, object type, or object class. In various implementations, an image editing system displays an image on a computing device, such as within an image editing application on a client device. In additional implementations, the image editing system enables a user to modify or change an image as well as generate new images. Additionally, a digital image can include one or more frames in a video or animation along with other digital images.

The term "compressed digital image" (or simply "compressed image") refers to a reduced-sized version of an image generated utilizing data compression techniques. In particular, a compressed image includes an approximation of an image that reduces the size of the image by discarding data/content from of the original image. In various implementations, a compressed image includes an image compressed utilizing lossy compression techniques, which often introduce compression artifacts. Examples of compression techniques include discrete cosine transform-based coding ("DCT") (e.g., JPEG images), discrete sine transform-based coding ("DST"), chroma subsampling, fractal compression, color space reduction, or a combination (e.g., HEVC compression for videos utilizing both DCT and DST).

In addition, an image may be compressed at different ratios. As used herein, the term "compression ratio" refers to a measurement of size or data reduction generated by compressing a digital image into a compressed digital image. For example, a compression ratio indicates an amount or ratio of compression between a digital image and a corresponding compressed digital image, such as the uncompressed size of an image over the compressed size of the image. In some instances, the compression ratio refers to a compression reduction amount (e.g., the compressed digital image is reduced by 40%, 70%, or 90%). In some implementations, the compression ratio refers to the compressed sized of a compressed digital image (e.g., a compressed digital image is 10%, 30%, or 60% of the original image).

As used herein, the term "compression artifact" (or simply "artifact") refers to a distortion of content with an image (or other media like video) created through lossy compression. In particular, when portions of an image are removed during compression, the loss of detail can create distortions. Examples of artifacts include blocking, ringing, contouring, posturizing, and blurring artifacts. In many instances artifacts occur at boundaries between encoded blocks within an image.

The term "machine learning," as used herein, refers to the process of constructing and implementing algorithms that can learn from and make predictions on data. In general, machine learning may operate by building models from example inputs (e.g., training), such as a latent code, to make data-driven predictions or decisions. In some example embodiments, machine learning is used for data mining, and statistical pattern recognition, such as collaborative feature learning, or learning features from a training image-based item set. Machine learning can include neural networks (e.g., a generative adversarial network), data-based models, or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional or deconvolutional neural networks that include various blocks, layers, components, and/or elements. In addition, a neural network is an algorithm (or set of algorithms) that implements deep learning techniques that utilize a set of algorithms to model high-level abstractions in data.

The term "generative adversarial network" (or simply "GAN"), as used herein, refers to a neural network that includes a generator neural network (or simply "generator") and a competing discriminator neural network (or simply "discriminator"). More particularly, the generator learns how to generate synthesized images that remove compression artifacts and/or add missing detail to an image such that the image appears smooth, natural, and realistic. The discriminator in the GAN competes with the generator to detect synthesized images. Specifically, the discriminator utilizes real images to learn to distinguish synthesized images from real images. Overall, the generator learns to synthesize realistic images that fool the discriminator, and the discriminator tries to detect when an input image is fake or synthesized (as opposed to a real image from the training images). Additional detail regarding iteratively training a GAN is provided below.

As used herein, the terms "loss function" or "loss model" refer to a function that indicates error amounts. As mentioned above, in some embodiments, a machine-learning algorithm repetitively trains to minimize overall loss (and maximize loss in some cases). In some embodiments, the image artifact removal system employs multiple loss functions and minimizes overall loss between multiple networks and models. Examples of loss functions include pixel loss, perceptual loss, and adversarial loss (e.g., generator loss and discriminator loss).

Referring now to the figures, FIG. 1 illustrates a schematic diagram of a system environment 100 in which an image artifact removal system 106 operates in accordance with one or more implementations. As shown in FIG. 1, the system environment 100 (or simply "environment 100") includes a client device 102 and a server device 108 connected via a network 112. Additional detail regarding these computing devices (e.g., the client device 102 and the server device 108) is provided below in connection with FIG. 10. Further, FIG. 10 also provides additional detail regarding networks, such as the illustrated network 112.

As shown, the environment 100 includes the client device 102. In various implementations, the client device 102 is associated with a user (e.g., a user client device), such as a user that requests automatic removal of compression artifacts from a compressed digital image. The client device 102 includes an image editing system 104 and image artifact removal system 106 (i.e., a digital-image compression-artifact removal system). In various implementations, the image editing system 104 implements the image artifact removal system 106. In alternative implementations, the image artifact removal system 106 is separate from the image editing system 104. While the image editing system 104 and the image artifact removal system 106 are shown on the client device 102, in some implementations, the image editing system 104 and the image artifact removal system 106 are located remotely from the client device 102 (e.g., on the server device 108), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools, color correction tools, and image manipulation tools. Moreover, the image editing system 104 optionally operates in connection with one or more applications to generate or modify digital images. For instance, in one or more implementations, the image editing system 104 operates in connection with digital design applications or other image editing applications.

As mentioned above, the image editing system 104 includes the image artifact removal system 106. As described in detail below, the image artifact removal system 106 utilizes machine-learning models to remove compression artifacts from compressed digital images. In particular, the image artifact removal system utilizes a GAN architecture to adversarially train the generator to remove compression artifacts from compressed digital images. Then, in response to identifying a compressed digital image with compression artifacts, the image artifact removal system utilizes the generator to remove the compression artifacts from the compressed digital image.

As shown, the environment 100 also includes the server device 108. The server device 108 includes an image artifact removal server system 110. For example, in one or more implementations, the image artifact removal server system 110 represents and/or provides similar functionality as described herein in connection with the image artifact removal system 106. In some implementations, the image artifact removal server system 110 supports the image artifact removal system 106 on the client device 102. Indeed, in one or more implementations, the server device 108 includes all, or a portion of, the image artifact removal system 106. For instance, the image artifact removal server system 110 learns parameters for the generator neural network utilizing a GAN architecture. The image artifact removal server system 110 then provides the generator neural network with the learned parameters to the client device 102 (e.g., as part of an image editing application). In other words, the client device 102 (e.g., the image artifact removal system 106) obtains (e.g., downloads) the generator neural network with the learned parameters from the server device(s) 108 (e.g., the image artifact removal server system 110).

In some implementations, the image artifact removal server system 110 includes a web hosting application that allows the client device 102 to interact with content and services hosted on the server device 108. To illustrate, in one or more implementations, the client device 102 accesses a web page supported by the server device 108. For example, the client device 102 provides a compressed digital image to the server device 108, and, in response, the image artifact removal server system 110 on the server device 108 generates an improved image the removes compression artifacts in the image. The server device 108 then provides the improved image to the client device 102 for display.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
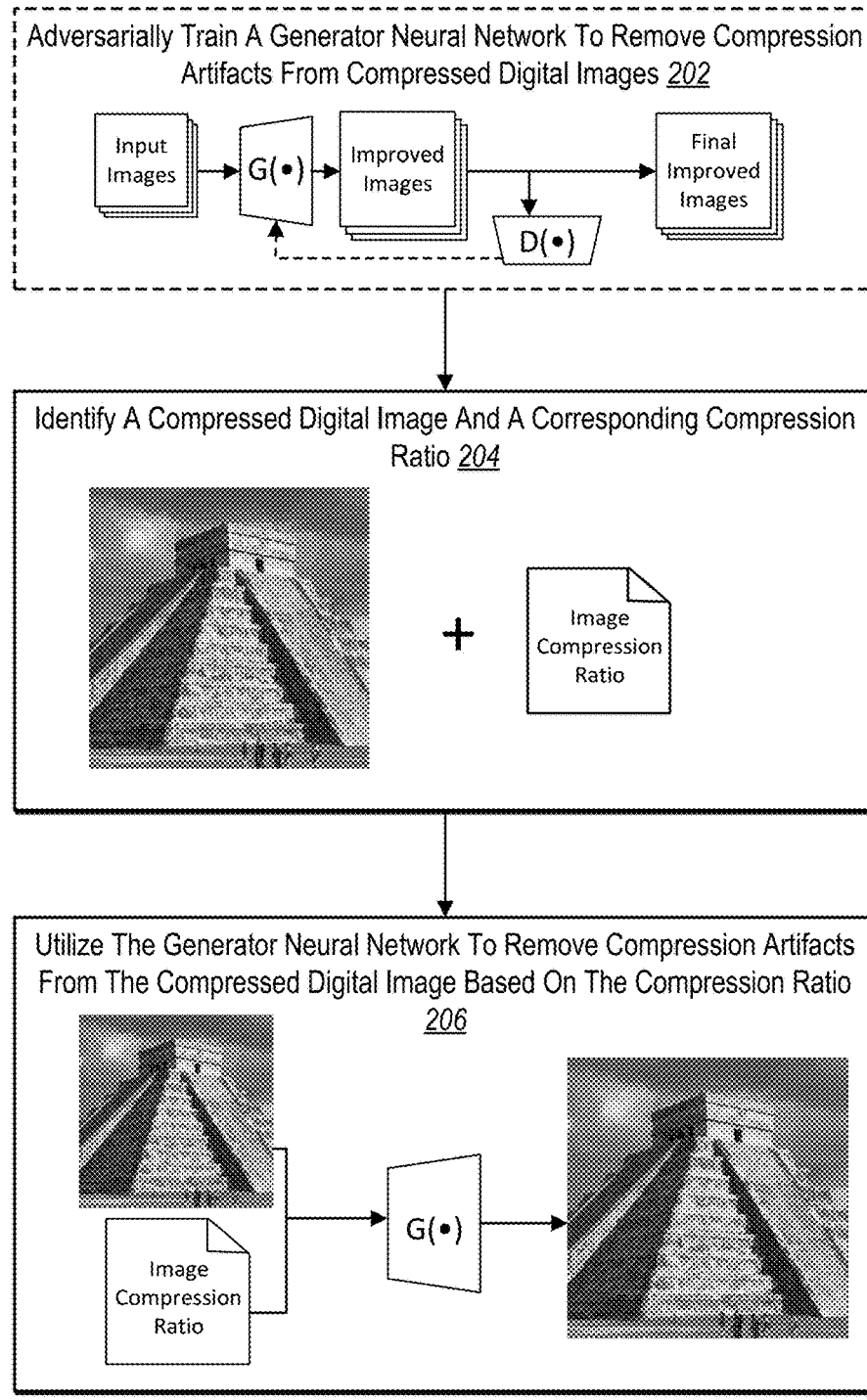
FIG. 2 illustrates an overview diagram of removing compression artifacts from a digital image in accordance with one or more implementations.

Turning to the next figure, FIG. 2 provides an overview of utilizing the image artifact removal system 106 to remove compression artifacts. In particular, FIG. 2 illustrates a series of acts 200 of removing compression artifacts from a digital image utilizing a generator neural network. In various implementations, the image artifact removal system 106 performs the series of acts 200. In some implementations, an image editing system and/or image editing application performs one or more of the acts included in the series of acts 200.

As shown, the series of acts 200 optionally includes an act 202 of adversarially training a generator neural network to remove compression artifacts from compressed digital images. In alternative implementations the image artifact removal system 106 the image artifact removal system 106 obtains a previously generator neural network. In a number of implementations, the image artifact removal system 106 utilizes a generator neural network that includes dilated attention residual neural network layers and a discriminator neural network. Further, in some implementations, the image artifact removal system 106 combines these neural networks into a GAN architecture to facilitate training the generator neural network based on adversarial loss. For example, the discriminator (shown as "D(•)") provides feedback to the generator (shown as "G(•)"). Additional detail regarding the GAN architecture and learning of parameters for the generator is provided below with respect to FIGS. 3A-3B.

As shown, the series of acts 200 includes an act 204 of identifying a compressed digital image and a corresponding compression ratio. For instance, in various implementations, the image artifact removal system 106 identifies an input image (e.g., a compressed digital image) that includes compression artifacts. The image artifact removal system 106 also identifies a compression ratio for the compressed digital image. For example, the image artifact removal system 106 extracts the compression ratio from metadata associated with the compressed digital image. In some implementations, the image artifact removal system 106 receives user input specifying and/or modifying the compression ratio.

As shown, the series of acts 200 includes an act 206 of utilizing the generator neural network to remove compression artifacts from the compressed digital image based on the compression ratio. For instance, in one or more implementations, the image artifact removal system 106 provides the compressed digital image and the compression ratio to the generator for inferencing. In some implementations, the image artifact removal system 106 modifies the generator (i.e., generator neural network) based on the compression ratio. In these implementations, the image artifact removal system 106 generates an improved image that removes the compression artifacts from the compressed digital image. Additional detail regarding utilizing a generator to remove compression artifacts is provided below in connection with FIG. 4A.

In some implementations, the image artifact removal system 106 provides the improved image to a client device for display. For example, the image artifact removal system 106 utilizes the generator on a client device to correct a compressed digital image and display the improved image. As mentioned above, in some implementations, the image artifact removal system 106 operates within an image editing application. In alternative implementations, the image artifact removal system 106 is a stand-alone application that allows for the removal of compression artifacts from one or more compressed digital images at one time.

Figure 3A:
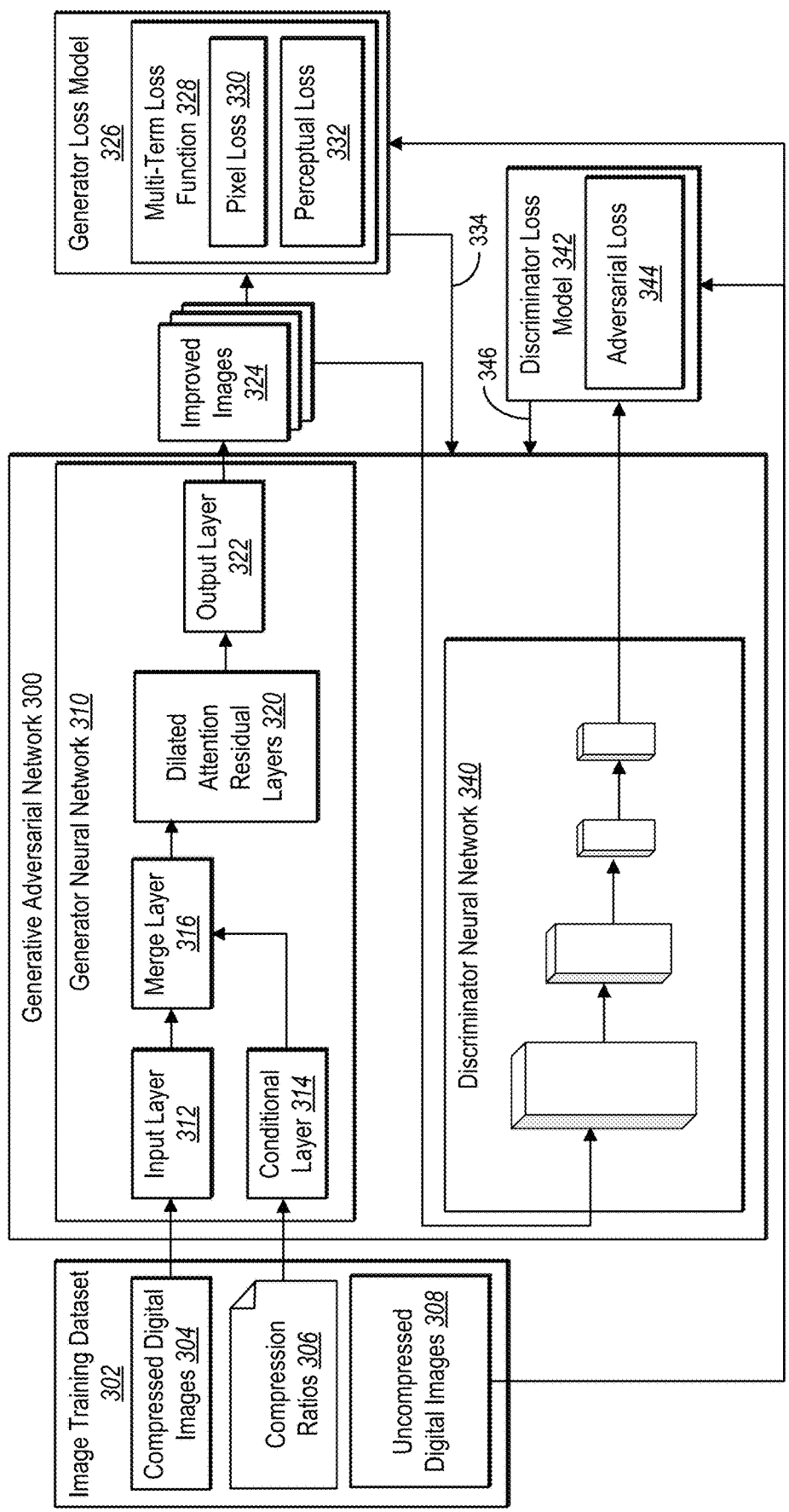
FIG. 3A illustrates a block diagram of learning parameters for a generator neural network within a generative adversarial network in accordance with one or more implementations.
Figure 3B:
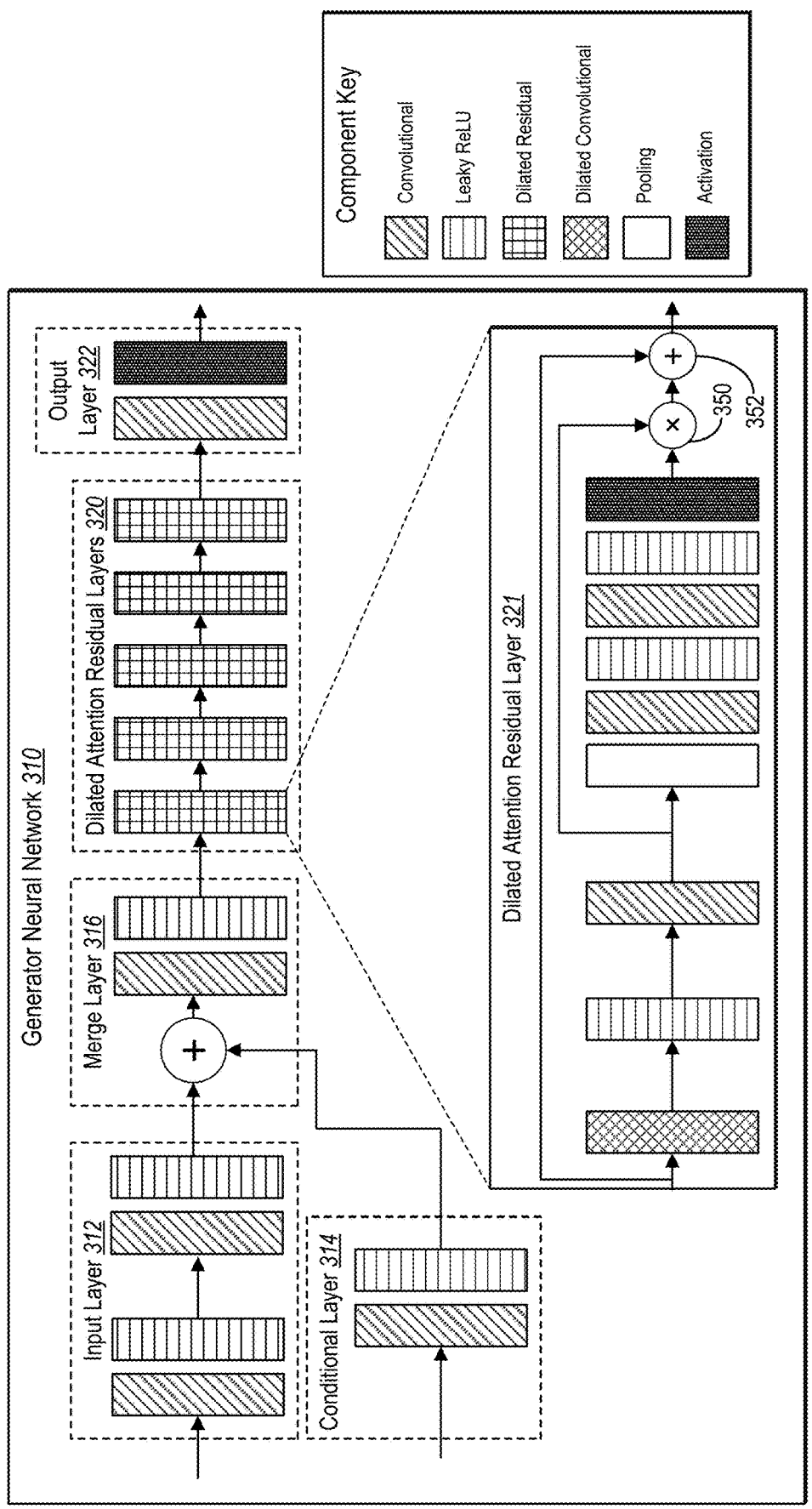
FIG. 3B illustrates a block diagram of a generator neural network within a generative adversarial network in accordance with one or more implementations.

Advancing to the next set of figures, FIGS. 3A-3B provide an example GAN architecture. As shown, FIGS. 3A-3B illustrate block diagrams of learning parameters for, and an architecture of, a generator neural network 310 within a generative adversarial network 300 in accordance with one or more implementations. In various implementations, the generative adversarial network 300 (or "GAN 300") illustrated in FIG. 3A is implemented by the image artifact removal system 106 on a client device and/or the image artifact removal server system 110 on the server device(s) 108.

As shown in FIG. 3A, the image artifact removal system 106 utilizes an image training dataset 302, improved images 324 output by the GAN 300, a generator loss model 326, and a discriminator loss model 342 to learn parameters for the generator neural network 310. As also shown, the image training dataset 302 includes compressed digital images 304, corresponding compression ratios, and corresponding uncompressed digital images 308.

The GAN 300, as shown, includes a generator neural network 310 (or simply "generator 310") and a discriminator neural network 340 (or simply "discriminator 340"). In various implementations, the generator 310 is a feed-forward convolutional neural network. Additionally, in some implementations, the discriminator 340 utilizes a patch-based architecture that has a local discriminator and a global discriminator.

In various implementations, the generator 310 retouches, synthesizes, generates, modifies, edits, creates, and/or outputs an improved version of an input image (e.g., a compressed digital image with one or more artifacts). As shown, the generator 310 includes several layers (i.e., neural network layers) that process and transform data to generate the improved images 324. In particular, the generator 310 includes an input layer 312, a conditional layer 314, a merge layer 316, dilated attention residual layers 320, and an output layer 322. In some implementations, the generator 310 includes fewer or additional neural network layers, components, and/or elements. Additionally, while each of the illustrated layers is described with respect to FIG. 3A, example architecture showing the components within each neural network layer is shown in FIG. 3B, which is described below.

As mentioned above, the generator 310 includes the input layer 312. In one or more implementations, the input layer 312 receives the compressed digital images 304 from the image training dataset. For example, the input layer 312 receives a Width×Height×3 (RGB) color image. In some implementations, the input layer 312 is part of an encoder of the generator 310 that encodes input data from compressed digital images 304 into feature vectors that represent latent image features of the image. Indeed, in various implementations, the feature vectors include latent or hidden features that encode the input data into vectors in a multidimensional image vector space.

As also mentioned above, the generator 310 includes the conditional layer 314. In one or more implementations, the conditional layer 314 receives (or detects) compression ratios 306 from the image training dataset 302. As described above, images may be compressed by different amounts as measured by a compression ratio. For example, in some implementations, the amount that an image is compressed signals the number and/or magnitude of compression artifacts in the image. Accordingly, the generator 310 utilizes the conditional layer 314 to determine the compression ratio for a corresponding input image.

In one or more implementations, the conditional layer 314 converts the compression ratio into a compression ratio parameter. For example, for a compression ratio of 10 (e.g., 90% compressed), the conditional layer 314 outputs the compression ratio parameter of 01, and/or for a compressed digital image with a poor compression ratio, the conditional layer 314 outputs a compression ratio parameter of 09. In some implementations, the conditional layer 314 includes two values that represent the ratio between the minimum quality factor and the maximum quality factor (e.g., the compression ratio).

By including the conditional layer 314, the image artifact removal system 106 is able to utilize a single generator 310 to remove compression artifacts from compressed digital images packaged at different compression amounts. Indeed, unlike conventional systems that require separate models, the image artifact removal system 106 trains a single generator 310 to operate across multiple compression ratios. Further, adding the flexibility of the conditional layer 314 allows for the image artifact removal system 106 to process compressed digital images at different compression ratios and/or rates than originally packaged (e.g., based on user input), which may yield superior image results.

As shown, the generator 310 includes the merge layer 316. In one or more implementations, the merge layer 316 concatenates, combines, applies, adds, multiplies, incorporates, and/or supplements the feature vectors of the compressed digital image from the input layer 312 with the compression ratio (e.g., compression ratio parameter) from the conditional layer 314. In some implementations, the merge layer 316 tags or labels the encoded compressed digital image with a compression ratio parameter as a signal to future layers of the generator 310. For example, based on the compression ratio parameter, the generator 310 learns which components of the neural network layers to apply and/or the appropriate weights to assign to each component to effectively and efficiently remove compression artifacts.

As also shown, the generator 310 includes the dilated attention residual layers 320. In general, the dilated attention residual layers 320 focus on the regions of an image that include compression artifacts. In some implementations, the dilated attention residual layers 320 are part of an encoder of the generator 310 (along with the input layer 312 and merge layer 316).

In various implementations, the dilated attention residual layers 320 include multiple layers, portions, or blocks of components, as further illustrated and described below with respect to FIG. 3B. In one or more implementations, each block within the dilated attention residual layers 320 contains a channel attention mechanism. For instance, the channel attention mechanism weights the feature vectors from convolutional layers according to global statistics of the activations such that different features are weighted differently. Indeed, the dilated attention residual layers 320 utilize the channel attention mechanism to learn weight amounts to apply to each feature in the feature vectors.

In one or more implementations, the dilated attention residual layers 320 include dilated convolutions that learn information from different scales (e.g., different compression ratios). In this manner, the dilated attention residual layers 320 utilize the dilated convolutions to assist the network in reaching a global contextual consistency in the spatial domain. Additionally, in various implementations, the dilated convolutions are learned differently (e.g., separately from each other). Further, in some implementations, the image artifact removal system 106 applies different blocks of the dilated attention residual layers 320 (and thus, their differently weighted dilated convolutions) based on a learned correspondence to image compression ratios.

In this manner, the image artifact removal system 106 is able to accurately correct compression artifacts and/or reconstruct images having different compression ratios utilizing a single model. Moreover, by creating a model that operates across a range of image sizes (e.g., scales with image resolution) and compression ratios, the image artifact removal system 106 creates/utilizes a generator 310 that is small, light, and portable. For example, in some implementations, the generator 310 is reduced to 1.2 megabytes, which is much smaller than the multiple models needed by conventional systems to perform similar operations (albeit less accurately and less efficiently).

In one or more implementations, when learning parameters for the generator 310, the image artifact removal system 106 initializes the weights in the dilated attention residual layers 320 randomly or based on default values. In some implementations, the image artifact removal system 106 initializes the weights in the dilated attention residual layers 320 in a manner that avoids gradient issues such as exploding and vanishing gradient problems utilizing rescaling. For example, in various implementations, the image artifact removal system 106 utilizes a fixed-updated weight initialization approach, which may stabilize the training with normalization. For instance, in some implementations, the image artifact removal system 106 utilizes the fixed-update initialization approach described in Zhang et al., "Fixup Initialization: Residual Learning Without Normalization," published in *7th International Conference on Learning Representations* (ICLR 2019), the entirety of which is incorporated herein by reference.

In various implementations, the dilated attention residual layers 320 outputs one or more encoded feature vectors of an input image (e.g., a compressed digital image 304). As previously described, the dilated attention residual layers 320 utilize dilated convolutions to reach a global consistency for images of different scales (e.g., resolutions and/or compression ratios). Further, the dilated attention residual layers 320 utilize an attention mechanism to ensure that different features are weighted differently to focus on the most important features of the image. Additional detail regarding the dilated attention residual layers 320 is provided below with respect to FIG. 3B.

As shown, the generator 310 also includes the output layer 322. In various implementations, the output layer 322 forms a decoder in the generator 310. Additionally, in one or more implementations, the output layer 322 normalizes the encoded feature vectors received from the dilated attention residual layers 320. For example, the output layer 322 utilizes an activation function, such as a sigmoid function, to normalize the output values (e.g., feature vectors) to a set interval (e.g., [0-1]). In addition, for each input image, the output layer 322 outputs an improved image 324 created by the generator 310.

In one or more implementations, such as when learning parameters for the generator 310, the image artifact removal system 106 utilizes the generator loss model 326. For example, as shown, the image artifact removal system 106 utilizes a multi-term loss function 328 having a pixel loss 330 and a perceptual loss 332. Indeed, the image artifact removal system 106 utilizes multiple loss functions that combine to preserve the visual quality of restored images. In alternative implementations, the image artifact removal system 106 utilizes a multi-term loss function 328 that includes additional or different loss functions.

In various implementations, the image artifact removal system 106 utilizes the generator loss model 326 to learn parameters for the generator 310. For example, the image artifact removal system 106 determines a generator loss feedback 334 from the improved images 324 and the corresponding uncompressed digital images 308 utilizing the generator loss model 326, and backpropagates the generator loss feedback 334 to the GAN 300 (e.g., the generator 310) for parameter learning.

As mentioned, in one or more embodiments, the image artifact removal system 106 utilizes a multi-term loss function 328 that includes a pixel loss 330 and a perceptual loss 332. In one or more implementations, the image artifact removal system 106 utilizes the pixel loss 330 to represent the differences between pixels of an improved image 324 and corresponding pixels of an uncompressed digital image 308, which serves as a ground truth. For example, Equation 1 below provides an example of an objective function for determining pixel loss.

$$\mathcal{L}_{Pixel} = \|\hat{T} - T\| \quad (1)$$

As shown in Equation 1, $\hat{T}$ represents an improved image 324 and T represents a corresponding uncompressed digital image 308. In various implementations, the image artifact removal system 106 determines the L1 loss for the pixel loss. In some implementations, the image artifact removal system 106 sets the weights in Equation 1 to 1.0. In alternative implementations, the image artifact removal system 106 determines the L2 loss for the pixel loss.

In some implementations, the image artifact removal system 106 utilizes the generator loss model 326 to measure the perceptual loss 332 between the improved images 324 and the uncompressed digital images 308. In various implementations, utilizing perceptual loss preserves the original content and perceptual quality of uncompressed digital images 308 (e.g., the ground truth). For example, the image artifact removal system 106 measures a perceptual loss amount by comparing feature representations between the improved images 324 and the uncompressed digital images 308.

In one or more implementations, the image artifact removal system 106 measures the perceptual loss 332 between the images at different levels, (e.g., at different layers of a VGG network). For example, the image artifact removal system 106 combines the loss at each level to formulate the perceptual loss 332. The image artifact removal system 106 then utilizes the perceptual loss 332 (in part) to learn parameters for the generator 310 to maintain feature representation similarities between the improved images 324 and the uncompressed digital images 308.

Equation 2 below provides one example of objective functions for determining the perceptual loss 332.

$$\mathcal{L}_{Perceptual} = \sum_i \left\| \frac{L_{Perceptual}}{i}(\hat{T}) - \frac{L_{Perceptual}}{i}(T) \right\| \quad (2)$$

$$\mathcal{L}_{Perceptual|i|j} = \frac{1}{W_{i,j} H_{i,j} C_{i,j}} \sum_{x=1}^{W_{i,j}} \sum_{y=1}^{H_{i,j}} \sum_{z=1}^{C_{i,j}} \left\| \Phi_{i,j}(\hat{T}) - \Phi_{i,j}(T) \right\|$$

As shown in Equation 2, the image artifact removal system 106 can determine the perceptual loss 332 based on measuring the distance (e.g., Euclidean distance in multidimensional vector space) between the feature representations of the improved images 324 (e.g., synthesized images) and the uncompressed digital images 308 (e.g., the ground truth). In addition, in Equation 2, $\Phi_{i,j}(\cdot)$ may represent a feature map obtained after different convolutional layers of the generator neural network 310. In some embodiments, i and j represent the different convolutional layers and feature maps produced by an activation component (e.g., a rectified linear unit (ReLU)). Further, in Equation 2, C may represent the number of channels of the produced feature maps, H may represent the height of the produced feature maps, and W may represent the weight of the produced feature maps. In some implementations, the image artifact removal system 106 sets the weights in Equation 2 to 2.0.

In various implementations, the image artifact removal system 106 combines the pixel loss 330 and the perceptual loss 332 into the multi-term loss function 328. In one or more implementations, the image artifact removal system 106 utilizes the combined loss the learn parameters for the generator neural network 310 to generate better quality improved images. For example, the image artifact removal system 106 backpropagates a loss amount of the multi-term loss function 328 as generator loss feedback 334. The image artifact removal system 106 utilizes the generator loss feedback 334 to tune the parameters and weights of the generator 310 to minimize future loss. For instance, the image artifact removal system 106 seeks to minimize distances between the improved images 324 and the uncompressed digital image 308 in a feature space or reconstruction.

As also shown, the GAN 300 includes the discriminator 340 (i.e., discriminator neural network 340). Generally, the discriminator 340 receives the improved images 324 and determines whether the images resemble real or fake images. The image artifact removal system 106 continuously trains the discriminator 340 to learn features or real images based on the uncompressed digital image 308 and/or other sets of real images.

To illustrate, FIG. 3A shows the discriminator loss model 342. In one or more implementations, the image artifact removal system 106 utilizes the discriminator loss model 342 to determine adversarial loss 344 (e.g., discriminator loss), which is utilized to improve the ability of the discriminator 340 to predict real or fake images. For example, the image artifact removal system 106 utilizes discriminator loss feedback 346 to tune the weights and parameters of the discriminator 340. Further, in various implementations, the image artifact removal system 106 utilizes the discriminator loss feedback 346 to further tune the generator 310, as described below.

In some implementations, the image artifact removal system 106 utilizes the adversarial loss 344 as part of training the GAN 300. For example, the image artifact removal system 106 applies a minimax loss objective function between the generator loss and the discriminator loss to train both the generator 310 and the discriminator 340 together. For instance, in one or more implementations, the image artifact removal system 106 trains the generator 310 and the discriminator 340 simultaneously by minimizing the generator loss and maximizing the discriminator loss. Equations 3 and 4 below provide example adversarial loss objective functions for the generator 310 ("G") and the discriminator 340 ("D") of the GAN. In example implementations, the image artifact removal system 106 sets the weights in Equations 3 and 4 to 0.01.

$$\mathcal{L}_{Adversarial}{}^{G} = -\mathbb{E}_{(x_r, x_f) \sim (P, Q)}[\log(\sigma(C(x_f) - C(x_r)))] \quad (3)$$

$$\mathcal{L}_{Adversarial}{}^{D} = \mathbb{E}_{(x_r, x_f) \sim (P, Q)}[\log(\sigma(C(x_f) - C(x_r)))] \quad (4)$$

In various implementations, the discriminator 340 utilizes a patch-based architecture that includes both a local discriminator and a global discriminator. For example, the image artifact removal system 106 employs a PatchGAN architecture that determines and penalizes differences based on changes at local image patches. Indeed, in some implementations, the discriminator 340 classifies each patch within an improved image 324 as real or fake, then averages the classifications across the patches to provide a final output to the discriminator loss model 342. Further, each time the discriminator 340 correctly identifies an input image as fake, the discriminator loss feedback 346 may be provided to the generator 310 for further training.

As mentioned above, FIG. 3B illustrates a more detailed architecture of the generator neural network 310 (e.g., generator 310). As shown, the generator 310 includes the input layer 312, the conditional layer 314, the merge layer 316, the dilated attention residual layers 320, and the output layer 322. More particularly, FIG. 3B illustrates corresponding components within each of these layers.

To illustrate, the input layer 312 shows a first convolutional component coupled to a first leaky ReLU (e.g., an activation component) along with a second convolutional component coupled to a second leaky ReLU. As shown, the conditional layer 314 also includes a convolutional component coupled to a leaky ReLU. Further, the merge layer 316 shows concatenating the output of the input layer 312 and the conditional layer 314 before again processing the concatenated data at another convolutional component coupled to a leaky ReLU.

In addition, FIG. 3B shows the dilated attention residual layers 320, which includes five dilated attention residual layers or blocks. Each of the blocks includes multiple components, as shown in the expansion box including a dilated attention residual layer 321. For example, in one or more implementations, each dilated attention residual layer 321 includes a dilated convolutional component, a first leaky ReLU, a first convolutional component, a pooling component (e.g., a global average pooling component), a second convolutional component, a second leaky ReLU, a third convolutional component, a third leaky ReLU, and an activation component (e.g., a sigmoid component).

As described above, a dilated attention residual layer 321 includes a channel attention mapping mechanism that weights feature vectors from the convolutional layers according to global statistics of the activations such that different features are weighted differently. In one or more implementations, the dilated attention residual layer 321 achieves attention by combining pre-processed data with post-processed data. To illustrate, the dilated attention residual layer 321 includes a first combiner 350 that combines (e.g., concatenates, multiplies, adds, mergers, or incorporates) partially-processed data with processed data. In addition, the dilated attention residual layer 321 includes a second combiner 352 that combines the output of the first combiner 350 with pre-processed data input into the dilated attention residual layer 321. In this manner, each dilated attention residual layer 321 applies a channel attention mechanism.

In addition, as shown, each dilated attention residual layer 321 begins with a dilated convolutional component. As described above, the dilated attention residual layers 320 learn information from different image scales (e.g., different image sizes and/or different compression ratios). In various implementations, the dilated convolutional component in each of the dilated attention residual layers 320 are separately trained and weighted based on the image size of a compressed digital image.

Further, in one or more implementations, the weight applied to a compressed digital image is based on the compression ratio of the image. For example, for a first compression ratio, the image artifact removal system 106 applies a first weight to a first subset of dilated attention residual layers 320 and for a second compression ratio, the image artifact removal system 106 applies a second, different weight to a second subset of dilated attention residual layers 320. In this manner, the image artifact removal system 106 trains the dilated attention residual layers 320 to apply different dilated attention residual blocks at different strengths based on the compression ratio of a compressed digital image (or a user input compression ratio).

As described above, the generator 310 in FIG. 3B also includes the output layer 322. As shown, the output layer 322 includes a convolutional component coupled to an activation component. In some implementations, the activation component is a sigmoid function that normalizes the encoded and processed data (e.g., feature vectors) of the generator 310 within a range of 0-1. The output layer may also generate improved images of a compressed digital image, as described above.

Figure 4A:
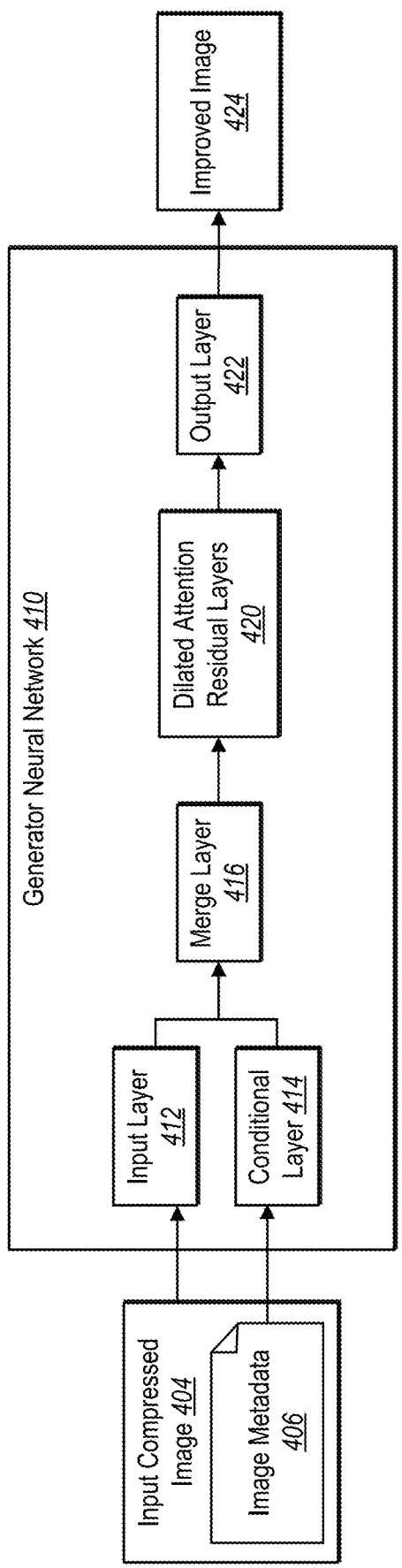
FIGS. 4A-4B illustrate block diagrams of utilizing a generator neural network to remove compression artifacts from compressed digital images and digital videos in accordance with one or more implementations.
Figure 4B:
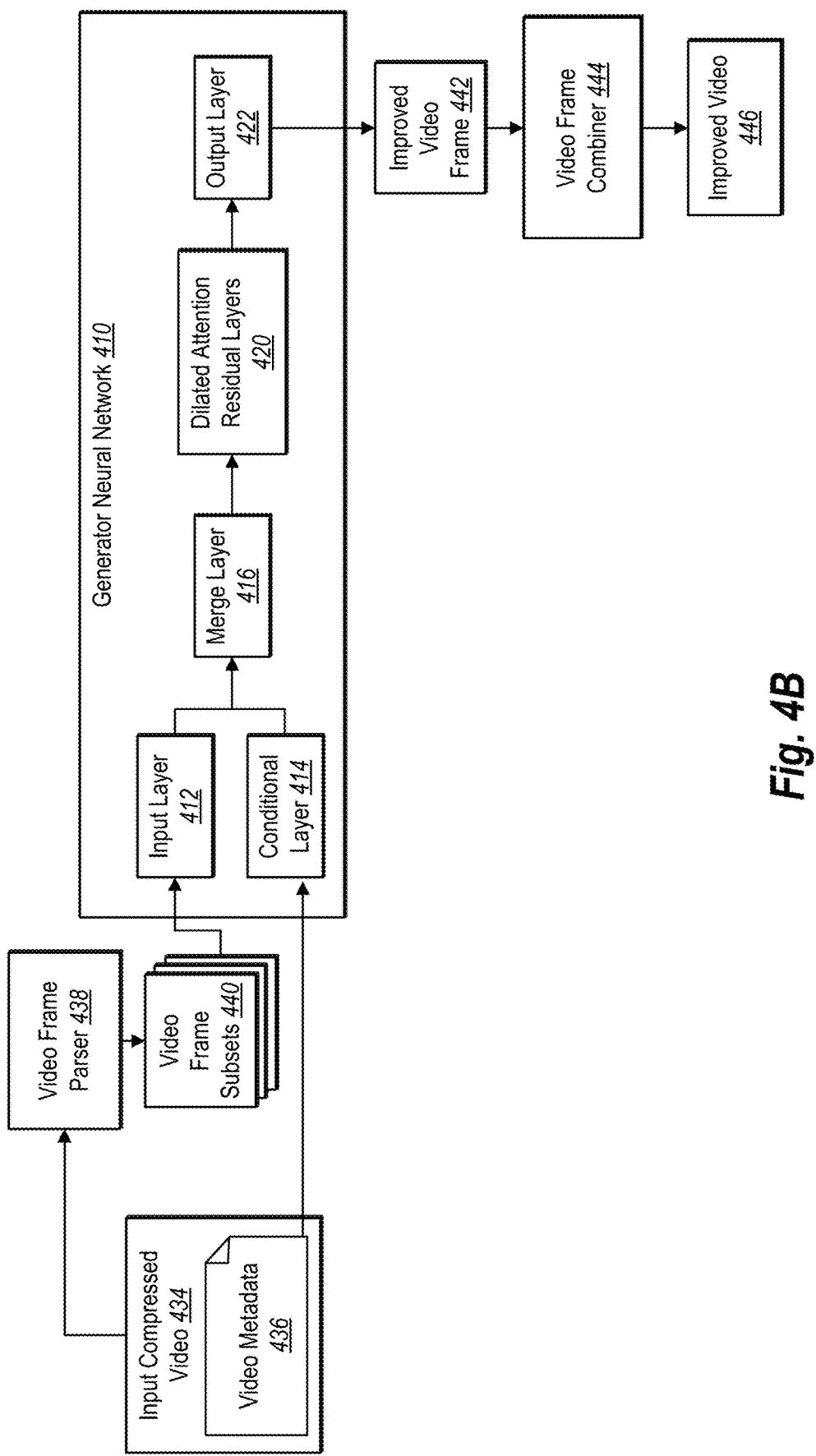

Upon learning parameters for the GAN (e.g., the generator and the discriminator within the GAN), in various implementations, the image artifact removal system 106 utilizes the generator 310 to remove compression artifacts from the compressed digital image. To illustrate, FIGS. 4A-4B show block diagrams of utilizing a generator neural network 410 (e.g., generator neural network 310 with learned parameters) to remove compression artifacts from a compressed digital image and digital video in accordance with one or more implementations. As shown, FIG. 4A includes an input compressed image 404, the generator neural network 410 (or simply "generator 410"), and an improved image 424.

In one or more implementations, the input compressed image 404 represents a compressed digital image that includes compression artifacts. For example, the input compressed image 404 is a JPEG image or another type of compressed digital image. As shown, the input compressed image 404 includes image metadata 406. In some implementations, the image metadata 406 includes information about the input compressed image 404 including a compression ratio for the image.

As mentioned above, FIG. 4A includes the generator 410. As shown, the generator 410 includes various neural network layers, such as an input layer 412, a conditional layer 414, a merge layer 416, dilated attention residual layers 420, and an output layer 422. In many implementations, these layers 412-422 in the generator 410 resemble corresponding layers 312-322 with learned parameters described above in connection with FIGS. 3A and 3B. Accordingly, utilizing these layers 412-422 in the generator 410, the image artifact removal system 106 generates the improved image 424 from the input compressed image 404.

To illustrate, in one or more implementations, the image artifact removal system 106 provides the input compressed image 404 to the generator 410. In addition, the image artifact removal system 106 identifies, extracts, receives, and/or otherwise obtains the compression ratio of the input compressed image 404. For example, the image artifact removal system 106 extracts the compression ratio from the image metadata 406 associated with the input compressed image 404.

Next, in some implementations, the image artifact removal system 106 utilizes the compression ratio to adjust the generator 410. For example, based on the compression ratio, the generator 410 utilizes a particular path of components and/or weights within the generator 410 to generate the improved image 424. If the compression ratio changes (e.g., via user input), the image artifact removal system 106 utilizes different components and/or weights within the generator 410.

As described above, in some implementations, the image artifact removal system 106 provides the generator 410 to a client device for inferencing. For example, the image artifact removal system 106 learns parameters for the generator 410 at a server device (or another remote computing device) as part of a GAN. The image artifact removal system 106 then provides the compact generator 410 to a client device. In this manner, the image artifact removal system 106, or a portion thereof, on the client device utilizes the generator 410 to quickly, efficiently, and accurately remove compression artifacts from compressed digital images.

As mentioned above, the image artifact removal system 106 is able to remove artifacts from compressed digital images/frames from digital video. To illustrate, FIG. 4B illustrates utilizing the generator 410 to remove compression artifacts from a digital video (or simply "video"). As shown, FIG. 4B includes an input compressed video 434 having video metadata 436, a video frame parser 438 that generates video frame subsets 440, the generator neural network 410 (or simply (the "generator 410") that generates an improved video frame 442, and a video frame combiner 444 that assembles the improved video 446.

In one or more implementations, the input compressed video 434 includes multiple compressed digital images arranged as sequential frames where one or more of the compressed digital images include compression artifacts. For simplicity, suppose the input compressed video 434 includes five frames of compressed digital images. In addition, as shown, the input compressed video 434 is associated with video metadata 436, which may provide information about the video and/or compressed digital images, such as the encoding standard and/or compression ratio applied to the video.

In one or more implementations, the video frame parser 438 receives input compressed video 434 and generates video frame subsets labeled Frames A-E. In some implementations, each video frame subset includes multiple, but not all, sequential compressed digital images from the input compressed video 434. For example, the video frame parser 438 selects a predetermined number of video frames (e.g., 2, 3, 5, or another number of frames) to group into a video frame sub set.

In various implementations, the video frame parser 438 groups the same video frame in multiple video frame subsets. For example, given a video frame subset of three frames, the video frame parser 438 generates a first video frame subset that includes Frames A-C, a second video frame subset that includes Frames B-D, and a third video frame subset that includes Frames C-D. In this example, Frame C is included in all three video frame subsets. In some implementations, the video frame parser 438 generates a video frame subset with fewer frames, such as in edge cases where the subset includes the first or last frame of the video (e.g., a video frame subset of Fames A-B or D-E).

As shown, the video frame parser 438 generates and provides video frame subsets 440 to the generator 410. As also shown, in various implementations, the generator 410 receives a set of multiple video frames and outputs a single improved video frame 442 (e.g., a target frame from the subset). In these implementations, the generator 410 processes the video frame subsets 440 as a combined group to preserve consistency from frame-to-frame throughout the digital video.

To elaborate, in various implementations, each video frame subset includes a target frame along with at least the previous video frame and/or the subsequent video frame. For example, the generator 410 receives a video frame subset that includes Frames B-E, where Frame C is the target frame, Frame B is the previous frame, and Frame D is the subsequent frame. In these implementations, the image artifact removal system 106 utilizes the generator 410 to generate an improved version of Frame C. However, to ensure consistency between video frames when reassembled and to avoid introducing additional artifacts between improved frames (e.g., a blinking effect), the generator 410 inferences the video frame subset as a combined group. In this manner, the generator 410 ensures that compression artifacts that appear across the video frame subset are accurately corrected in the target frame.

To continue the example above, in one or more implementations, the generator 410 receives the first video frame subset (e.g., Frames A-C) and outputs Improved Frame B. Additionally, the generator 410 receives the second video frame subset (e.g., Frames B-D) and outputs Improved Frame C. Further, the generator 410 receives the third video frame subset (e.g., Frames C-E) and outputs Improved Frame D. By following this process, the image artifact removal system 106 ensures that compression artifact removal smoothly transitions from one frame to the next.

As shown, the improved video frames 442 are assembled by the video frame combiner 444, which assembles the improved video 446. In some implementations, rather than providing video frame subsets of multiple video frames to the generator 410, the image artifact removal system 106 provides one frame at a time. For example, in these implementations, the image artifact removal system 106 utilizes a post-video-processing model to removed blinking or other artifacts that appear across a series of sequential frames.

FIGS. 4A, 4B, 5A, and 5B describe various embodiments of training and inferencing a generator neural network. Accordingly, the actions and algorithms described in connection with FIGS. 4A, 4B, 5A, and 5B provide example structures for performing a step for removing the plurality of compression artifacts from the compressed digital image based on the compression ratio and a generator neural network. Further, because FIGS. 4A, 4B, 5A, and 5B describe one or more correlations between training a generator neural network (adversarially with a GAN) and utilizing the generator neural network, FIGS. 4A, 4B, 5A, and 5B also provide support for actions, equations, and algorithms for performing the step for removing the plurality of compression artifacts from the compressed digital image based on the compression ratio and a generator neural network.

Figure 5:
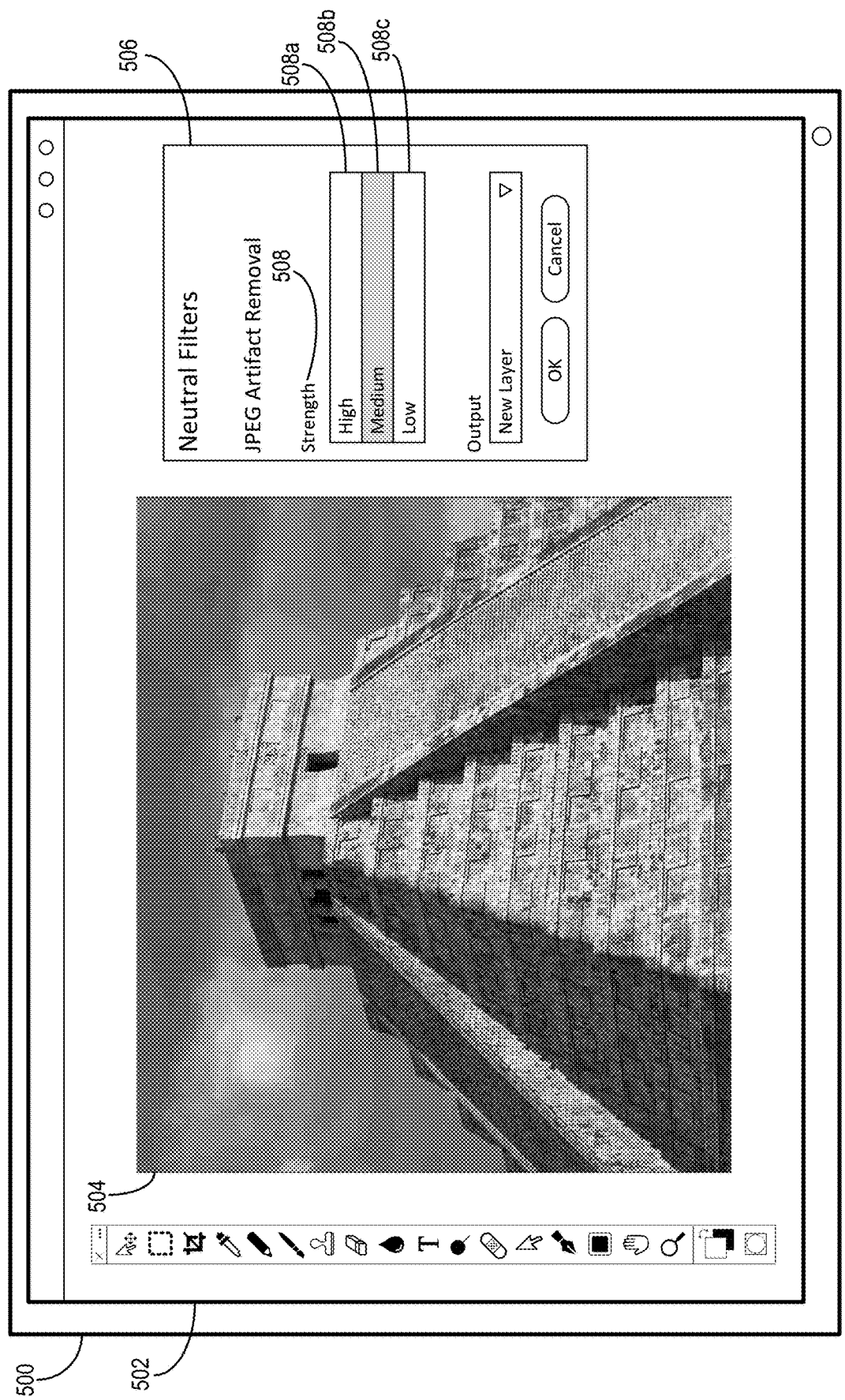
FIG. 5 illustrates a graphical user interface for editing compressed digital images in accordance with one or more implementations.

Turning now to FIG. 5, a graphical example of the image artifact removal system 106 removing compression artifacts is described. For instance, FIG. 5 illustrates a graphical user interface of editing compressed digital images in accordance with one or more implementations. As shown, FIG. 5 illustrates a client device 500 having a graphical user interface 502 that includes an image 504 (i.e., a digital image). In various implementations, the client device 500 represents the client device 102 introduced above with respect to FIG. 1. As illustrated, the client device 500 includes an image editing application that implements the image editing system 104, which utilizes the image artifact removal system 106. Also, in some implementations, the image artifact removal system 106, or optionally the image editing application, generates the graphical user interface 502 in FIG. 5.

In various implementations, the image editing application facilitates user interaction with the image 504. For example, the image editing application and/or the image artifact removal system 106 provides an image filer tool 506 (e.g., a JPEG artifact removal tool) that enables the user to request automatically removal of the compression artifacts in the image 504. In response to detecting a compression artifact removal request, the image artifact removal system 106 generates (as described above) and displays an improved image within the graphical user interface 502 (e.g., displayed as a new image layer or replacement image).

In various implementations, the image artifact removal system 106 enables the user to modify the magnitude of the image artifact removal system 106 in removing compression artifacts. To illustrate, the graphical user interface 502 includes a strength setting 508 that includes various settings (e.g., high 508a, medium 508b, and low 508c). For example, in response to seeing the image artifact removal system 106 remove compression artifacts for the image 504 under default settings, a user desires to strengthen (or weaken) the compression ratio to yield a potentially better (or at least different) result. Accordingly in one or more implementations, in response to detecting a selection of a strength setting 508, the image artifact removal system 106 modifies the compression ratio of the image 504 and re-inferences the image 504 via the generator.

As described above, by changing the compression ratio, the image artifact removal system 106 modifies the compression ratio parameter input into the generator. Further, the generator itself modifies the components and/or weights utilized to encode and decode the image 504. For example, increasing the strength setting 508 (from the medium or low setting) may cause the image artifact removal system 106 to increase the compression ratio and, thus, remove additional compression artifacts. Likewise, decreasing the strength setting 508 (from the medium or high setting) may cause the image artifact removal system 106 to decrease the compression ratio and, thus, remove fewer compression artifacts.

As noted above, the image artifact removal system 106 improves accuracy over conventional systems. For example, researchers compared the image artifact removal system 106 to various conventional object detection systems. The results indicated that the image artifact removal system 106 achieves superior results with other deep-learning compression artifact removal models.

To illustrate, FIG. 6 illustrates a chart 600 comparing the image artifact removal system in accordance with one or more implementations with state-of-the-art systems. In particular, the chart 600 is a JPEG quality factor comparison between the image artifact removal system 106 and other state-of-the-art systems. As shown, the chart 600 includes results of three different compression ratios (e.g., 90%. 80%, and 70%) measured by two different accuracy metrics (e.g., PSNR or peak signal-to-noise and SSIM or structural similarity index measurement) across four state-of-the-art systems and the image artifact removal system 106.

As shown, the state-of-the-art systems include a standard GAN architecture, represented by Pix2Pix, which is disclosed in Isola et al., "Image-to-Image Translation with Conditional Adversarial Networks", in IEEE on Computer Vision and Pattern Recognition (CVPR), 2017. In addition, the models include state-of-the-art deblocking represented by ARCNN, FAST-ARCNN, and DN-CNN. The ARCNN and DN-CNN models are described in Dong et al, "Compression Artifacts Reduction by a Deep Convolutional Network," in IEEE International Conference on Computer Vision (ICCV), 2015, pp. 576-584. Further, the FAST-ARCNN model is disclosed in Dong et al., "Compression Artifacts Reduction by a Deep Convolutional Network," in Proceedings of International Conference on Computer Vision (ICCV), 2016.

For fairness, the researchers tuned each dataset with the same training dataset. While the researchers tested a variety of datasets, FIG. 6 corresponds to the Live 1 dataset applied from Sheikh et al, "Live Image Quality Assessment Database Release", 2005, the entirety of which is incorporated herein by reference. However, the results in the chart 600 in FIG. 6 are representative of the results from testing other datasets.

As shown in the chart 600 in FIG. 6, both metrics of PSNR and SSIM of the image artifact removal system 106 outperform the other algorithms on all JPEG qualities and evaluation metrics by a large margin. As a result of improving the PSNR and the SSIM, the image artifact removal system 106 is able to yield much better results than the state-of-the-art algorithms. Indeed, the chart 600 indicates that the image artifact removal system 106 is able to produce images with fewer blocking artifacts, and thus, higher accuracy.

Figure 7A:
FIGS. 7A-7B illustrate visual comparison of compression artifact removal between state-of-the-art deblocking oriented models and the image artifact removal system in accordance with one or more implementations with the state-of-the-art systems.
Figure 7B:
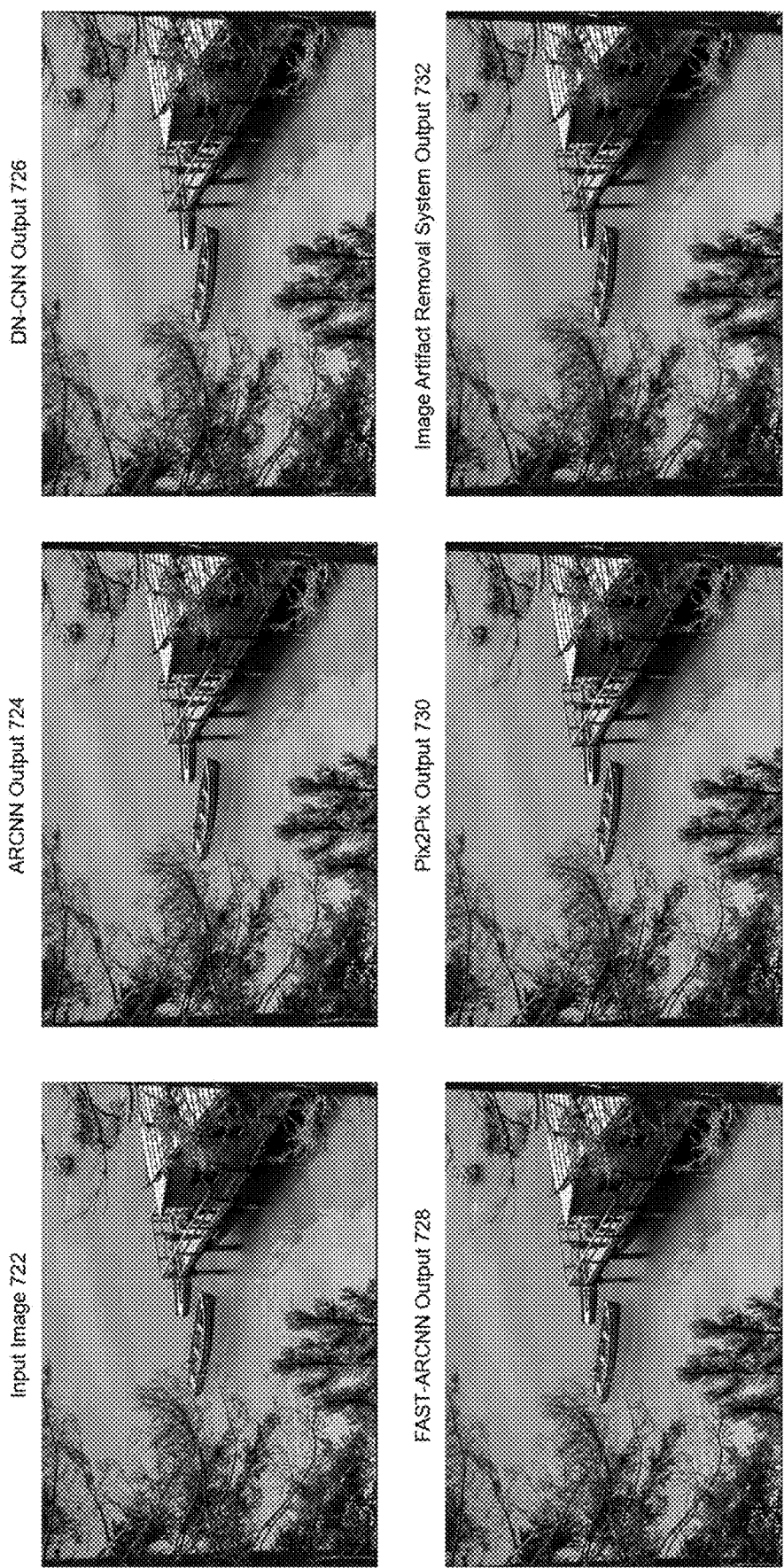

In addition to quantitative comparisons, the researchers also performed visual qualitative comparisons. To illustrate, FIGS. 7A-7B show visual example results comparing compression artifact removal between the image artifact removal system in accordance with one or more implementations with state-of-the-art systems. As shown, FIG. 7A shows images of a coconut tree against a cloudy sky. More particularly, FIG. 7A compares visual depictions of an input image 702 to output images from the state-of-the-art systems (e.g., ARCNN output 704, DN-CNN output 706, FAST-ARCNN output 708, and Pix2Pix output 710), as well as from the image artifact removal system 106 (e.g., image artifact removal system output 712).

FIG. 7B includes similar visual depictions for an image of a small boat on a river dock. In particular, FIG. 7B includes an input image 722 and output images from the state-of-the-art systems (e.g., ARCNN output 724, DN-CNN output 726, FAST-ARCNN output 728, and Pix2Pix output 730), as well as an output image from the image artifact removal system 106 (e.g., image artifact removal system output 732).

As shown in FIGS. 7A and 7B, the image artifact removal system 106 does a much better job of removing the compression artifacts visual compared to the state-of-the-art algorithms. Indeed, the image artifact removal system output 712 includes significantly sharper edges with fewer blocking and ringing artifacts, as compared with the state-of-the-art algorithms such that the overall visual quality is greatly improved.

Figure 8:
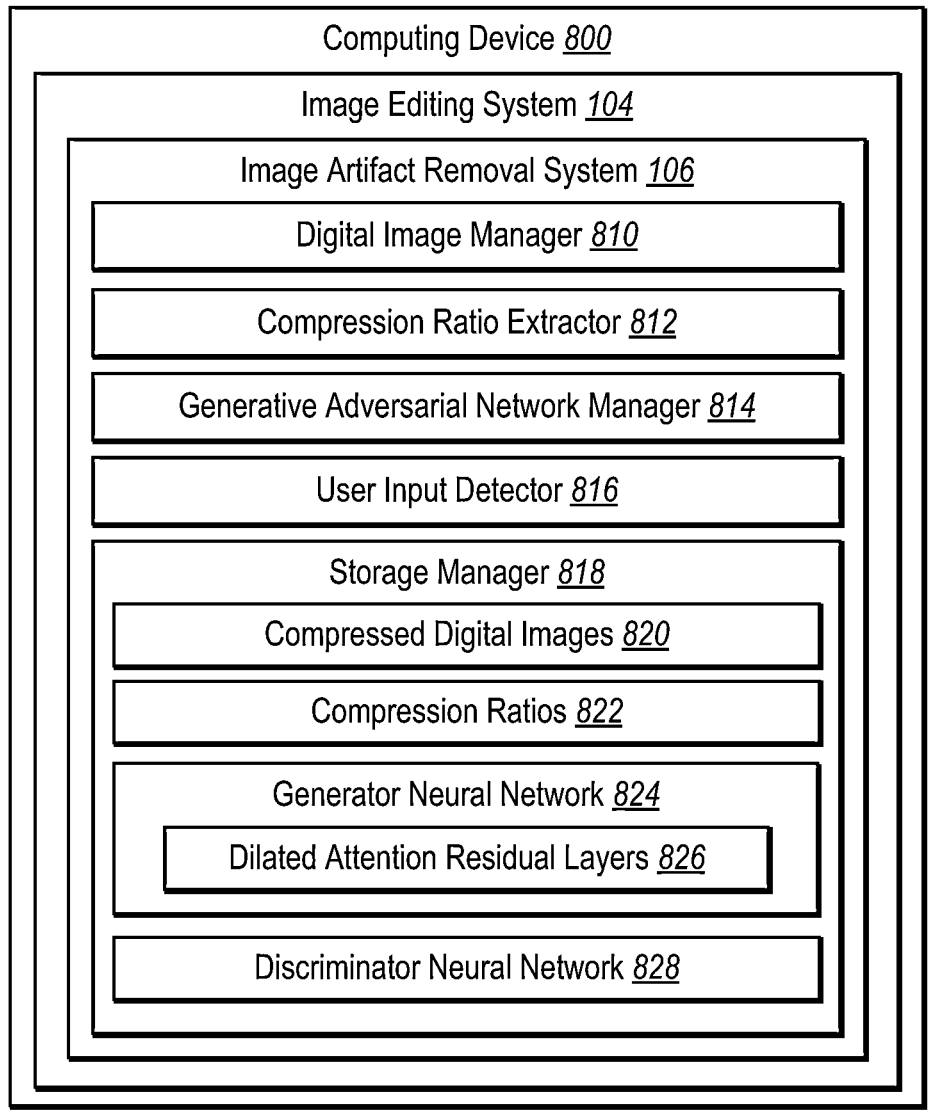
FIG. 8 illustrates a schematic diagram of the image artifact removal system in accordance with one or more implementations.

Referring now to FIG. 8, additional detail is provided regarding the capabilities and components of the image artifact removal system 106 in accordance with one or more implementations. In particular, FIG. 8 shows a schematic diagram of an example architecture of the image artifact removal system 106 implemented within the image editing system 104 and hosted on a computing device 800.

As shown, the image artifact removal system 106 is located on a computing device 800 within an image editing system 104. In general, the computing device 800 may represent various types of client devices. For example, in some implementations, the client is a mobile device, such as a laptop, a tablet, a mobile telephone, a smartphone, etc. In other implementations, the computing device 800 is a non-mobile device, such as a desktop or server, or another type of client device. Additional details with regard to the computing device 800 are discussed below as well as with respect to FIG. 10.

As illustrated in FIG. 8, the image artifact removal system 106 includes various components for performing the processes and features described herein. For example, the image artifact removal system 106 includes a digital image manager 810, a compression ratio extractor 812, a generative adversarial network manager 814, a user input detector 816, and a storage manager 818. As shown, the storage manager 818 includes compressed digital images 820, compression ratios 822, a generator neural network 824 having dilated attention residual layers 826, and a discriminator neural network 828. Each of the components mentioned above is described below in turn.

As mentioned above, the image artifact removal system 106 includes the digital image manager 810. In general, the digital image manager 810 facilitates identifying, accessing, receiving, obtaining, generating, packaging, compressing, importing, exporting, copying, modifying, removing, and organizing images including a compressed digital image (and/or digital videos). In one or more implementations, the digital image manager 810 operates in connection with an image editing system 104 (e.g., an image editing application) to access and edit images, as described previously. In some implementations, the digital image manager 810 communicates with the storage manager 818 to store and retrieve the compressed digital images 820, for example, within a digital image database managed by the storage manager 818.

As shown, the image artifact removal system 106 includes the compression ratio extractor 812. In general, the compression ratio extractor 812 identifies, extracts, receives, modifies, and/or otherwise obtains the compression ratio of a compressed digital image 820. For example, in one or more implementations, the compression ratio extractor 812 extracts the compression ratio from analyzing the image metadata associated with a compressed digital image 820. In some implementations, the compression ratio extractor 812 detects a change to the compression ratio (e.g., based on an input request) and applies the compression ratio modification, as described above.

As shown, the image artifact removal system 106 includes the generative adversarial network manager 814 (or simply "GAN manager 814"). In various implementations, the GAN manager 814 generates, identifies, obtains, trains, tunes, applies, executes, modifies, inferences, and/or otherwise manages neural networks within a GAN architecture. For example, the GAN manager 814 generates and/or adversarially trains the generator neural network 824 having the dilated attention residual layers 826 along with the discriminator neural network 828, as described above. In addition, in various implementations, the GAN manager 814 utilizes a generator neural network 824 that is trained to remove compression artifacts from compressed digital images (or digital videos). For instance, as described above, the GAN manager 814 provides an input compressed digital image to a generator neural network, which synthesizes an improved image that removes the compression artifacts from the input image (or input video), as described above.

As shown, the image artifact removal system 106 includes the user input detector 816. In various implementations, the user input detector 816 is configured to detect, receive, and/or facilitate user input on the computing device 800. In some instances, the user input detector 816 detects one or more user interactions (e.g., a single interaction, or a combination of interactions) with respect to a digital image in a user interface. For instance, the user input detector 816 detects a user interaction from a keyboard, mouse, touchpad, touchscreen, and/or any other input device in connection with the computing device 800. For example, the user input detector 816 detects user input with respect to modifying the compression strength of a generator neural network, as described above.

Each of the components 810-828 of the image artifact removal system 106 optionally includes software, hardware, or both. For example, the components 810-828 optionally include one or more instructions stored on a computer-readable storage medium and executable by processors of one or more computing devices, such as a client device (e.g., a mobile client device) or server device. When executed by the one or more processors, the computer-executable instructions of the image artifact removal system 106 causes a computing device to perform the feature learning methods described herein. Alternatively, the components 810-828 optionally include hardware, such as a special-purpose processing device to perform a certain function or group of functions. In addition, the components 810-828 of the image artifact removal system 106 optionally includes a combination of computer-executable instructions and hardware.

Furthermore, the components 810-828 of the image artifact removal system 106 may be implemented as one or more operating systems, as one or more stand-alone applications, as one or more modules of an application, as one or more plug-ins, as one or more library functions or functions that may be called by other applications, and/or as a cloud-computing model. Thus, the components 810-828 may be implemented as a stand-alone application, such as a desktop or mobile application. Additionally, the components 810-828 may be implemented as one or more web-based applications hosted on a remote server. The components 810-828 may also be implemented in a suite of mobile device applications or "apps." To illustrate, the components 810-

828 may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-8, the corresponding text, and the examples provide several different methods, systems, devices, and non-transitory computer-readable media of the image artifact removal system 106. In addition to the foregoing, one or more implementations are described in terms of flowcharts comprising acts for accomplishing a particular result, such as the flowcharts of acts shown in FIG. 9. Additionally, the acts described herein may be repeated or performed in parallel with one another or parallel with different instances of the same or similar acts.

Figure 9:
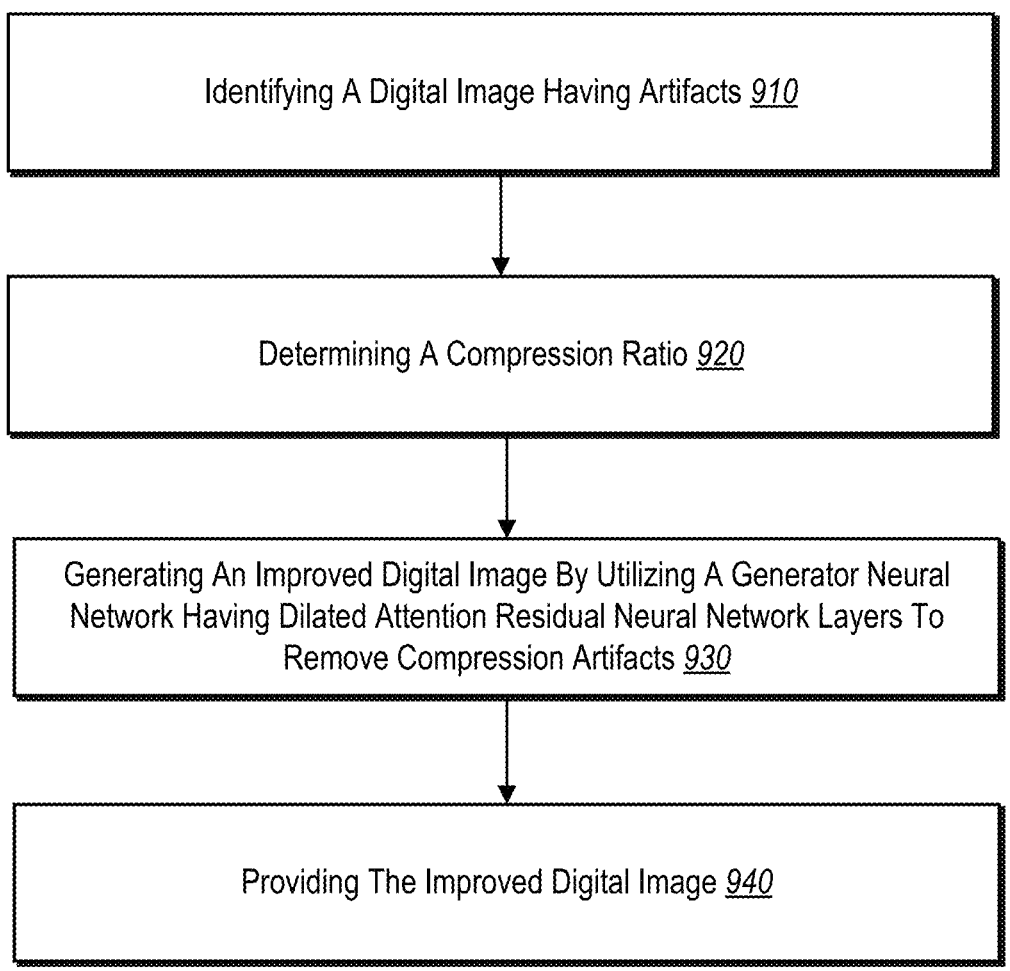
FIG. 9 illustrates a flowchart of a series of acts of utilizing a generator neural network to remove compression artifacts from digital images in accordance with one or more implementations.

As mentioned, FIG. 9 illustrates a flowchart of a series of acts in accordance with one or more implementations. While FIG. 9 illustrates acts according to one implementation, alternative implementations may omit, add to, reorder, and/or modify any of the acts shown. The acts of FIG. 9 are optionally performed as part of a method. Alternatively, a non-transitory computer-readable medium comprises instructions that, when executed by one or more processors, cause a computing device to perform the acts of FIG. 9. In some implementations, a system is configured to perform the acts of FIG. 9.

To illustrate, FIG. 9 shows a flowchart of a series of acts 900 of utilizing a generator neural network to remove compression artifacts from digital images in accordance with one or more implementations. In various implementations, the series of acts 900 is implemented on one or more computing devices, such as the client device 102, the server device 108, the client device 500, or the computing device 800. In addition, in some implementations, the series of acts 900 is implemented in a digital environment for creating or editing digital content (e.g., digital images). For example, the series of acts 900 is implemented on one or more computing devices (e.g., server devices) having memory (or memory devices) that includes a generator neural network comprising a plurality of dilated attention residual neural network layers.

The series of acts 900 includes an act 910 of identifying a digital image having artifacts. For instance, the act 910 includes identifying a compressed digital image having complex compression artifacts. In one or more implementations, the compressed digital image is a JPEG image generated utilizing quantization.

As shown, the series of acts 900 also includes an act 920 of determining a compression ratio. For instance, the act 920 involves determining a compression ratio of a compressed digital image. In one or more implementations, the act 920 includes extracting a compression ratio from a compressed digital image from metadata associated with the compressed digital image. For instance, in some implementations, the act 920 includes determining the compression ratio of the compressed digital image by analyzing metadata of the compressed digital image.

As shown in FIG. 9, the series of acts 900 further includes an act 930 of generating an improved digital image by utilizing a generator neural network having dilated attention residual neural network layers to remove compression artifacts. For instance, the act 930 includes generating an improved digital image by utilizing a generator neural network including a plurality of dilated attention residual neural network layers to remove compression artifacts from the compressed digital image based on the compression ratio.

In one or more implementations, the act 930 includes generating an improved digital image by utilizing the generator neural network to remove compression artifacts from the compressed digital image by adjusting weighted parameters of the plurality of dilated attention residual neural network layers based on the compression ratio. Additionally, in example implementations, each dilated attention residual neural network layer of the plurality of dilated attention residual neural network layers includes a dilated convolution component, an activation component, a convolution component, and a channel attention mechanism component.

In some implementations, the act 930 includes utilizing the plurality of dilated attention residual neural network layers to remove blocking compression artifacts and ringing compression artifacts from the compressed digital image. In some implementations, the act 930 includes utilizing the generator neural network as a feedforward reconstruction convolutional neural network.

In various implementations, the act 930 includes generating a first activation output by processing the compression ratio at a first set of neural network elements of the generator neural network; generating a second activation output by processing the compressed digital image at a second set of neural network elements of the generator neural network; combing the first activation output and the second activation output to generate a combined activation output; and generating a third activation output by processing the combined activation output at a third set of neural network elements of the generator neural network.

In one or more implementations, the act 930 also includes generating the improved digital image utilizing the generator neural network by mapping features from the third activation output utilizing a plurality of channel attention mechanisms within the plurality of dilated attention residual neural network layers. In some implementations, the act 930 also includes utilizing the generator neural network by processing the third activation output through the plurality of dilated attention residual neural network layers.

In example implementations, the act 930 also includes providing the third activation output to a first dilated attention residual neural network layer of the plurality of dilated attention residual neural network layers; combining the third activation output with the output of the first dilated attention residual neural network layer; and providing the combined output of the first dilated attention residual neural network layer to a second dilated attention residual neural network layer of the plurality of dilated attention residual neural network layers.

As shown, the series of acts 900 also includes an act 940 of providing the improved digital image. For instance, the act 940 includes providing the improved digital image to a client device for display. In one or more implementations, the act 940 includes displaying the improved digital image within an image editing application on the client device as an additional layer added to the compressed digital image.

The series of acts 900 optionally includes additional acts. For example, in one or more implementations, the series of acts 900 includes the acts of receiving an additional compressed digital image; determining an additional compression ratio for the additional compressed digital image, where the additional compression ratio of the additional compressed digital image differs from the compression ratio of the compressed digital image; and generating an additional improved digital image utilizing the generator neural network based on the additional compressed digital image and the additional compression ratio, where the generator neural network utilizes different components to process the compressed digital image and the additional compressed digital image based on the compression ratio of the compressed digital image differing from the additional compression ratio of the additional compressed digital image.

In some implementations, the series of acts 900 includes the acts of receiving input modifying the compression ratio, modifying the operation of the generator neural network in accordance with the modified compression ratio; and generating the improved digital image utilizing the generator neural network based on the modified compression ratio.

In various implementations, the series of acts 900 includes the acts of identifying a video including a plurality of compressed digital images arranged as sequential frames; providing a first set of compressed digital images from the plurality of compressed digital images to the generator neural network for inferencing, the first set of compressed digital images including the compressed digital image and an additional compressed digital image; and generating the improved digital image utilizing the generator neural network to remove compression artifacts from the compressed digital image based on the first set of compressed digital images. In some implementations, the series of acts 900 also includes the acts of providing a second set of compressed digital images from the plurality of compressed digital images to the generator neural network for inferencing, the second set of compressed digital images including the additional compressed digital image; generating an improved additional digital image utilizing the generator neural network to remove compression artifacts from the additional compressed digital image based on the second set of compressed digital images; and combining the improved digital image and the improved additional digital image to generate an improved video.

In example implementations, the series of acts 900 includes the act of generating the generator neural network utilizing adversarial loss in connection with a discriminator neural network. In some implementations, the series of acts 900 includes the act of utilizing pixel loss and/or perceptual loss to generate the generator neural network. In some implementations, the series of acts 900 includes the act of modifying the operation of the generator neural network based on different compression ratios. Indeed, in various implementations, the act 920 includes generating the generator neural network to operate across a plurality of compression ratios corresponding to compressed digital images.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image artifact removal system to automatically select objects and partial objects on digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 10:
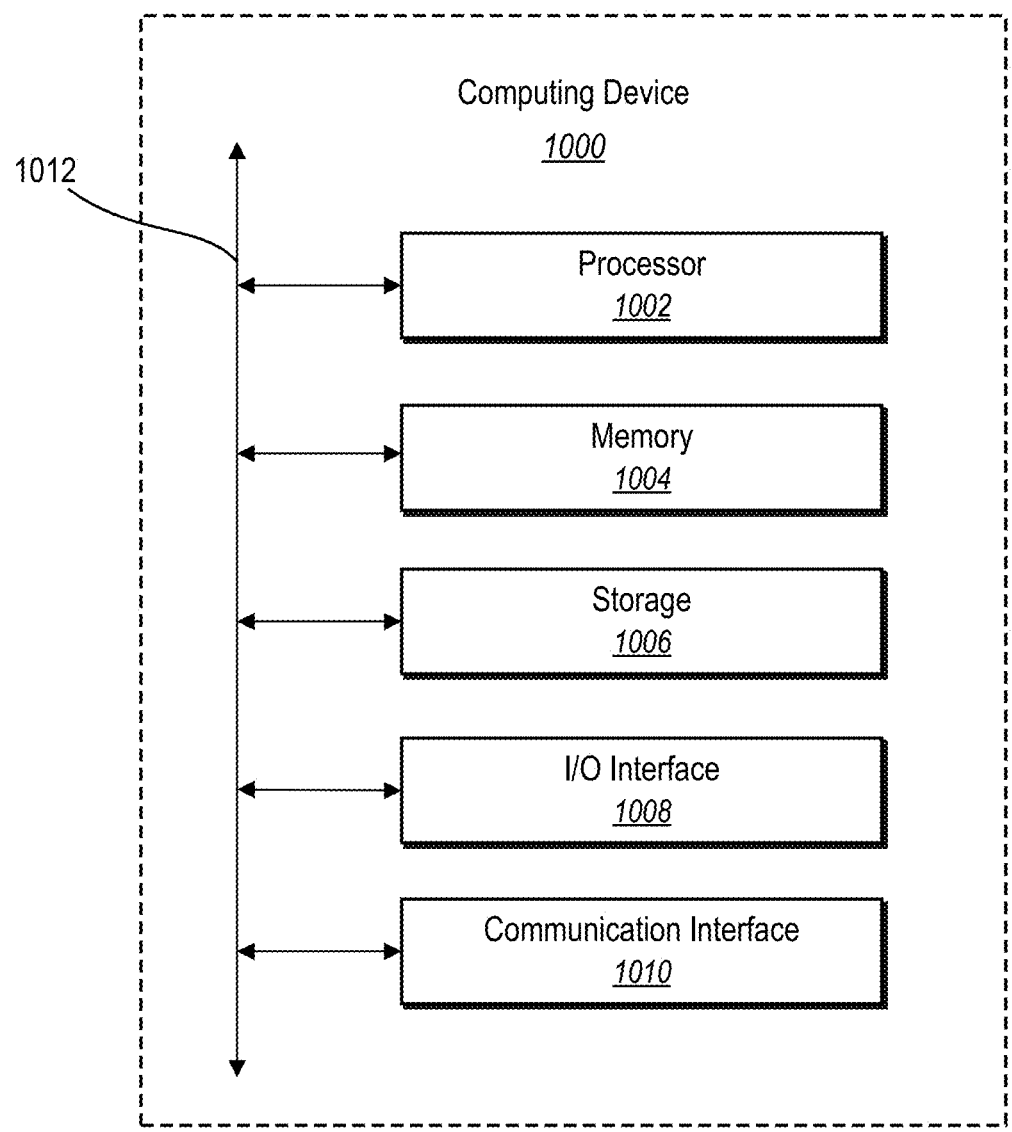
FIG. 10 illustrates a block diagram of an example computing device for implementing one or more implementations of the present disclosure.

FIG. 10 illustrates a block diagram of a computing device 1000 that may be configured to perform one or more of the processes described above. One will appreciate that one or more computing devices, such as the computing device 1000 may represent the computing devices described above (e.g., the client device 102, the server device 108, the client device 500, or the computing device 800). In one or more implementations, the computing device 1000 may be a mobile device (e.g., a laptop, a tablet, a smartphone, a mobile telephone, a camera, a tracker, a watch, a wearable device, etc.). In some implementations, the computing device 1000 may be a non-mobile device (e.g., a desktop computer, a server device, a web server, a file server, a social networking system, a program server, an application store, or a content provider). Further, the computing device 1000 may be a server device that includes cloud-based processing and storage capabilities.

As shown in FIG. 10, the computing device 1000 includes one or more processor(s) 1002, memory 1004, a storage device 1006, I/O interfaces 1008 (i.e., input/output interfaces), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 includes a non-transitory storage medium described above. The storage device 1006 may include a hard disk drive (HDD), flash memory, a Universal Serial Bus (USB) drive, or a combination of these or other storage devices.

As shown, the computing device 1000 includes one or more I/O interfaces 1008, which are provided to allow a user to provide input to (e.g., user strokes), receive output from, and otherwise transfer data to and from the computing device 1000. These I/O interfaces 1008 may include a mouse, keypad, or a keyboard, a touch screen, camera, optical scanner, network interface, modem, another known I/O device, or a combination of these I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 further includes a communication interface 1010. The communication interface 1010 includes hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 further includes a bus 1012. The bus 1012 includes hardware, software, or both that connects components of computing device 1000.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions which, when executed by a processing device, cause the processing device to perform operations comprising:
   determining, utilizing one or more neural network layers, a compression ratio of a compressed digital image;
   extracting features from the compressed digital image;
   generating a combination of the compression ratio and the features extracted from the compressed digital image;
   generating an improved digital image by utilizing a generator neural network comprising a plurality of dilated attention residual neural network layers to remove compression artifacts from the compressed digital image based on the compression ratio by processing the combination of the compression ratio and the features extracted from the compressed digital image; and
   providing the improved digital image to a client device for display.

2. The non-transitory computer-readable medium of claim 1, wherein the operations further comprise generating the improved digital image utilizing the generator neural network by utilizing the plurality of dilated attention residual neural network layers to remove blocking compression artifacts and ringing compression artifacts from the compressed digital image.

3. The non-transitory computer-readable medium of claim 1, wherein the operations further comprise:
   generating a first activation output by processing the compression ratio at a first set of neural network elements of the generator neural network;
   generating a second activation output by processing the compressed digital image at a second set of neural network elements of the generator neural network;
   combining the first activation output and the second activation output to generate a combined activation output; and
   generating a third activation output by processing the combined activation output at a third set of neural network elements of the generator neural network.

4. The non-transitory computer-readable medium of claim 1, wherein each dilated attention residual neural network layer of the plurality of dilated attention residual neural network layers comprises a dilated convolution component, an activation component, a convolution component, and a channel attention mechanism component.

5. The non-transitory computer-readable medium of claim 1, wherein the operations further comprise modifying operation of the generator neural network based on different compression ratios.

6. The non-transitory computer-readable medium of claim 3, wherein the operations further comprise generating the improved digital image utilizing the generator neural network by mapping features from the third activation output utilizing a plurality of channel attention mechanisms within the plurality of dilated attention residual neural network layers.

7. The non-transitory computer-readable medium of claim 3, wherein the operations further comprise utilizing the generator neural network by processing the third activation output through the plurality of dilated attention residual neural network layers.

8. The non-transitory computer-readable medium of claim 5, wherein the operations further comprise:
   receiving an additional compressed digital image;
   determining an additional compression ratio for the additional compressed digital image, wherein the additional compression ratio of the additional compressed digital image differs from the compression ratio of the compressed digital image; and
   generating an additional improved digital image utilizing the generator neural network based on the additional compressed digital image and the additional compression ratio, wherein the generator neural network utilizes different components to process the compressed digital image and the additional compressed digital image based on the compression ratio of the compressed digital image differing from the additional compression ratio of the additional compressed digital image.

9. The non-transitory computer-readable medium of claim 5, wherein the operations further comprise:
   receiving input modifying the compression ratio;
   modifying operation of the generator neural network in accordance with the modified compression ratio; and
   generating the improved digital image utilizing the generator neural network based on the modified compression ratio.

10. The non-transitory computer-readable medium of claim 7, wherein the operations further comprise:
    providing the third activation output to a first dilated attention residual neural network layer of the plurality of dilated attention residual neural network layers;
    combining the third activation output with an output of the first dilated attention residual neural network layer; and
    providing a combined output of the first dilated attention residual neural network layer to a second dilated attention residual neural network layer of the plurality of dilated attention residual neural network layers.

11. A system comprising:
    a memory component; and
    one or more processing devices coupled to the memory component, the one or more processing devices to perform operations comprising:

extracting a compression ratio from a compressed digital image from metadata associated with the compressed digital image;

extracting features from the compressed digital image;

generating a combination of the compression ratio and the extracted features;

generating an improved digital image by utilizing a generator neural network to remove compression artifacts from the compressed digital image by adjusting weighted parameters of a plurality of dilated attention residual neural network layers based on the combination of the compression ratio and the extracted features; and providing the improved digital image to a client device for display.

12. The system of claim 11, wherein the operations further comprise:

identifying a video comprising a plurality of compressed digital images arranged as sequential frames;

providing a first set of compressed digital images from the plurality of compressed digital images to the generator neural network for inferencing, the first set of compressed digital images comprising the compressed digital image and an additional compressed digital image; and generating the improved digital image utilizing the generator neural network to remove the compression artifacts from the compressed digital image based on the first set of compressed digital images.

13. The system of claim 11, wherein the operations further comprise causing the system to generate the improved digital image utilizing the generator neural network as a feedforward reconstruction convolutional neural network.

14. The system of claim 11, wherein the operations further comprising causing the system to generate the generator neural network across a plurality of compression ratios corresponding to compressed digital images.

15. The system of claim 11, wherein the operations further comprise causing the system to generate the generator neural network utilizing adversarial loss in connection with a discriminator neural network.

16. The system of claim 11, wherein the operations further comprise causing the system to utilize pixel loss and perceptual loss to generate the generator neural network.

17. The system of claim 12, wherein the operations further comprise:

providing a second set of compressed digital images from the plurality of compressed digital images to the generator neural network for inferencing, the second set of compressed digital images comprising the additional compressed digital image;

generating an improved additional digital image utilizing the generator neural network to remove the compression artifacts from the additional compressed digital image based on the second set of compressed digital images; and combining the improved digital image and the improved additional digital image to generate an improved video.

18. A method comprising:

determining, utilizing one or more neural network layers, a compression ratio of a compressed digital image comprising a plurality of compression artifacts;

extracting features from the compressed digital image;

generating a combination of the compression ratio and the features extracted from the compressed digital image;

a step for removing the plurality of compression artifacts from the compressed digital image based on the combination of the compression ratio and the features extracted from the compressed digital image utilizing a generator neural network; and providing a modified version of the compressed digital image to a client device for display.

19. The method of claim 18, further comprising identifying the compressed digital image comprising the plurality of compression artifacts, wherein the compressed digital image is a jpeg image generated utilizing quantization.

20. The method of claim 18, further comprising determining the compression ratio of the compressed digital image by analyzing metadata of the compressed digital image.

* * * * *